United States Patent
Hayakawa et al.

(10) Patent No.: US 10,360,013 B2
(45) Date of Patent: *Jul. 23, 2019

(54) MANAGEMENT SYSTEM FOR CREATING SERVICE

(71) Applicant: HITACHI, LTD., Tokyo (JP)

(72) Inventors: Ayumi Hayakawa, Tokyo (JP); Yasushi Ikeda, Tokyo (JP); Toshimasa Takahashi, Tokyo (JP); Kazuya Kousaka, Tokyo (JP); Hidenori Akatoki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 15/325,796

(22) PCT Filed: Jan. 16, 2015

(86) PCT No.: PCT/JP2015/051110
§ 371 (c)(1),
(2) Date: Jan. 12, 2017

(87) PCT Pub. No.: WO2016/113913
PCT Pub. Date: Jul. 21, 2016

(65) Prior Publication Data
US 2017/0161053 A1    Jun. 8, 2017

(51) Int. Cl.
*G06F 8/65* (2018.01)
*G06F 8/20* (2018.01)
(Continued)

(52) U.S. Cl.
CPC .......... *G06F 8/65* (2013.01); *G06F 8/20* (2013.01); *G06F 8/36* (2013.01); *G06F 9/44505* (2013.01);
(Continued)

(58) Field of Classification Search
CPC ..... G06F 8/71; G06F 8/60; G06F 8/61; G06F 8/65; G06F 8/36; G06F 8/20; G06F 9/45536; G06F 9/5055; G06F 9/45505
(Continued)

(56) References Cited

U.S. PATENT DOCUMENTS 8,078,909 B1 *  12/2011  Satish ............... G06F 11/302
                                                      714/15
8,627,309 B2 *  1/2014   Scheidel ............. G06F 8/61
                                                      717/172
(Continued)

FOREIGN PATENT DOCUMENTS

JP    2007-241610 A    9/2007
JP    2014-010667 A    1/2014
(Continued)

*Primary Examiner* — Marina Lee
(74) *Attorney, Agent, or Firm* — Volpe and Koenig, P.C.

(57) ABSTRACT

A management system coupled to an operation target system including one or more operation target apparatuses creates or edits a service template for operation automation, the service template being associated with one or more components. A processor (1) receives a version upgrade request that designates a service template; and (2) causes a version of a target component associated with the designated service template or a copy of the designated service template to be different from a version of a target component already associated with the designated service template, in response to the version upgrade request.

15 Claims, 32 Drawing Sheets

(51) Int. Cl.
  *G06F 8/36*     (2018.01)
  *G06F 9/445*    (2018.01)
  *G06F 9/50*     (2006.01)
  *G06F 11/00*    (2006.01)
(52) U.S. Cl.
  CPC ........ *G06F 9/44536* (2013.01); *G06F 9/5055* (2013.01); *G06F 11/00* (2013.01)
(58) Field of Classification Search
  USPC .................................................. 717/168–178
  See application file for complete search history.

(56) References Cited

U.S. PATENT DOCUMENTS

| | | | | |
|---|---|---|---|---|
| 8,793,379 | B2* | 7/2014 | Upadhya | G06F 3/0605 709/226 |
| 10,223,157 | B2* | 3/2019 | Kousaka | G06F 8/36 |
| 2002/0124115 | A1* | 9/2002 | McLean | G06F 9/451 719/310 |
| 2005/0065993 | A1* | 3/2005 | Honda | G06F 9/45512 709/200 |
| 2005/0198377 | A1* | 9/2005 | Ferguson | G06F 17/30867 709/238 |
| 2007/0028179 | A1* | 2/2007 | Levin | G06Q 10/10 715/762 |
| 2007/0234335 | A1* | 10/2007 | Takahashi | G06F 8/71 717/168 |
| 2007/0294670 | A1* | 12/2007 | Hisaki | G06F 8/10 717/120 |
| 2011/0209140 | A1* | 8/2011 | Scheidel | G06F 8/61 717/172 |
| 2011/0307412 | A1* | 12/2011 | Rolia | G06Q 10/06 705/348 |
| 2013/0036212 | A1* | 2/2013 | Jibbe | H04L 67/1095 709/223 |
| 2013/0159987 | A1* | 6/2013 | Shi | G06F 9/45558 717/170 |
| 2014/0006432 | A1 | 1/2014 | Miyagi et al. | |
| 2014/0075345 | A1* | 3/2014 | Fippel | G06F 8/34 715/762 |
| 2014/0317515 | A1* | 10/2014 | Suda | G06F 3/04817 715/736 |
| 2017/0004007 | A1* | 1/2017 | Kousaka | G06F 8/36 |
| 2017/0161053 | A1* | 6/2017 | Hayakawa | G06F 11/00 |
| 2018/0260213 | A1* | 9/2018 | Yamaguchi | G06F 8/64 |
| 2018/0287865 | A1* | 10/2018 | Gorelik | H04L 67/34 |

FOREIGN PATENT DOCUMENTS

| | | |
|---|---|---|
| WO | 2013/140609 A1 | 9/2013 |
| WO | 2014/188502 A1 | 11/2014 |

* cited by examiner

Component management table 421

| # | Component name | Version | Executable file path | Component uk |
|---|---|---|---|---|
| 1 | Provisioning volume | 01.00.00 | C:\HCSA\ProvisioningVolume\010000\···.bat | 1 |
| 2 | Provisioning volume | 01.10.00 | C:\HCSA\ProvisioningVolume\011000\···.bat | 2 |
| 3 | Create pair volume | 01.00.00 | C:\HCSA\CreatePairVolume\010000\···.bat | 3 |
| 4 | ··· | ··· | ··· | ··· |

FIG. 7

Component property management table 422

| # | Component uk | Display name | Key name | Initial value | Input/output type | Property group | Customized UI generation information |
|---|---|---|---|---|---|---|---|
| 1 | 1 | HostName | storage.host.name | Null | In | Host Group | List |
| 2 | 1 | Number of Volume | storage.number | Null | In | Volume usage Group | Integer |
| 3 | 1 | Volume Capacity | storage.capacity | 10GB | In | Volume usage Group | Unit list |
| 4 | 1 | Number of path | storage.number | 2 | In | Host Group | Integer |
| 5 | 1 | Volume uk | storage.volume.uk | Null | Out | Null | Null |
| 6 | 1 | Path info | storage.path.info | Null | Out | Null | Null |
| 7 | 2 | HostName | storage.host.name | Null | In | Host Group | List |
| 8 | 2 | Volume uk | storage.volume.uk | Null | In | Volume usage Group | Integer |
| 9 | 2 | Path info | storage.path.info | Null | In | Path Info Group | Text field |
| ... | | ... | ... | ... | ... | ... | ... |

FIG. 8

ST management table 423

| # | ST name | ST version | ST uk | Flow uk | ST type |
|---|---|---|---|---|---|
| 1 | Provisioning & pair | 01.00.00 | 1 | 1 | Release |
| 2 | Provisioning & pair | 01.10.00 | 2 | 2 | Debug |
| 3 | provisioning | 01.00.00 | 3 | 3 | Release |
| ... | ... | ... | ... | ... | ... |

Flow management table 424

| # | Flow uk | Constituent component uk List | Property mapping list |
|---|---|---|---|
| 1 | 1 | 1, 2 | {Service property uk(1)= Component uk(1). storagehost.name},{Service property uk(2)=Component uk(2). storage.volume.uk}, {Component uk(1). storage.pathinfo = Component uk(2). storage.pathinfo},... |
| 2 | 2 | 1 | {Service property uk(8)= Component uk(1). storagehost.name},{Service property uk(9)=Component uk(1).. storage.volume.uk},... |
| 3 | 3 | 2 | Null |
| ... | ... | ... | ... |

FIG. 10

ST property management table 425

| # | ST uk | ST property uk | Display name | Key name | Input/output type | Property group | Customized UI generation information |
|---|---|---|---|---|---|---|---|
| 1 | 1 | 1 | HostName | service1.host.name | In | Host Group | List |
| 2 | 1 | 2 | Number of Volume | service1.volume.number | In | Volume usage Group | integer |
| 3 | 1 | 3 | Volume Capacity | service1.volume.capacity | In | Volume usage Group | Unit list |
| 4 | 1 | 4 | Number of path | service1.path.number | In | Path Info Group | integer |
| 5 | 1 | 5 | Path generation number | service1.pair.generation.number | In | Path Info Group | integer |
| 6 | 1 | 6 | Volume uk | service1.volume.uk | Out | Null | Null |
| 7 | 1 | 7 | Path info | service1.path.info | Out | Null | Null |
| ... | ... | ... | ... | ... | ... | ... | ... |

Service management table 426

| # (1101) | Service name (1102) | Service explanation (1103) | ST uk (1104) | Service uk (1105) |
|---|---|---|---|---|
| 1 | execute Provisioning & pair | Provisioning volume and then create pair volume | 1 | 1 |
| 2 | execute Provisioning & pair 2 | Provisioning volume and then create pair volume | 1 | 2 |
| 3 | execute provisioning | Provisioning volume | 3 | 3 |
| 4 | ... | ... | ... | ... |

FIG. 12

Service property setting table 427

| # | Property set value | Service template property uk | Service uk |
|---|---|---|---|
| 1 | STORAGEHOST | 1 | 1 |
| 2 | 1 | 2 | 1 |
| 3 | 20 | 3 | 1 |
| 4 | Null | 4 | 1 |
| 5 | 2 | 5 | 1 |
| 6 | STORAGEHOST2 | 1 | 2 |
| 7 | 2 | 2 | 2 |
| 8 | ... | ... | ... |

FIG. 19

Step management table 428

| # | Outdated ST uk | Outdated ST version | Step name | Current component name | Current version | Latest component name | Latest version | Status |
|---|---|---|---|---|---|---|---|---|
| | 1902 | 1903 | 1904 | 1905 | 1906 | 1907 | 1908 | 1909 |
| 1 | 1 | 001 | Host Name | Host Name | 001 | Host Name | 002 | Applied |
| 2 | 1 | 001 | Volume Capacity | Volume Capacity | 001 | Volume Capacity | 002 | Not applied |
| ... | ... | ... | ... | ... | ... | ... | ... | ... |

(1901 = #)

MANAGEMENT SYSTEM FOR CREATING SERVICE

TECHNICAL FIELD

This invention generally relates to an operation automation technology for an operation target apparatus.

BACKGROUND ART

Computer systems have been scaled up in recent years, thus increasing labor hours for constructing a computer system and operating an apparatus to be operated (operation target apparatus). An automation technology is a technology for automating management and maintenance (hereinafter referred to collectively as "operation") of such an operation target apparatus. PTL 1 discloses the technology of a management system implementing such an automation technology, wherein when components in a flow are all intended for automated operation, the flow is represented by an icon indicating that the components are all automated, and when components for automated operation and components for manual settings are mixed in a flow, the flow is represented by an icon indicating that the components are mixed.

CITATION LIST

Patent Literature

[PTL 1]
WO 2013/140609

SUMMARY OF INVENTION

Technical Problem

Components continue to be improved because of function expansion or bug fixing. PTL 1, however, does not disclose such improvements of components.

Solution to Problem

A management system coupled to an operation target system including one or more operation target apparatuses creates or edits a service template for operation automation, the service template being associated with one or more components. A processor is configured to: (1) receive a version upgrade request that designates a service template; and (2) cause a version of a target component associated with the designated service template or a copy of the designated service template to be different from a version of a target component already associated with the designated service template, in response to the version upgrade request.

Advantageous Effects of Invention

The version of a service template can be efficiently upgraded along with an improvement of a component.

BRIEF DESCRIPTION OF DRAWINGS

FIG. 7 illustrates a configuration of a component property management table.
FIG. 8 illustrates a configuration of a service template (ST) management table.
FIG. 9 illustrates a configuration of a flow management table.
FIG. 10 illustrates a configuration of an ST property management table.
FIG. 11 illustrates a configuration of a service management table.
FIG. 12 illustrates a configuration of a service property setting table.
FIG. 19 illustrates a configuration of a step management table.

DESCRIPTION OF EMBODIMENTS

Figure 1:
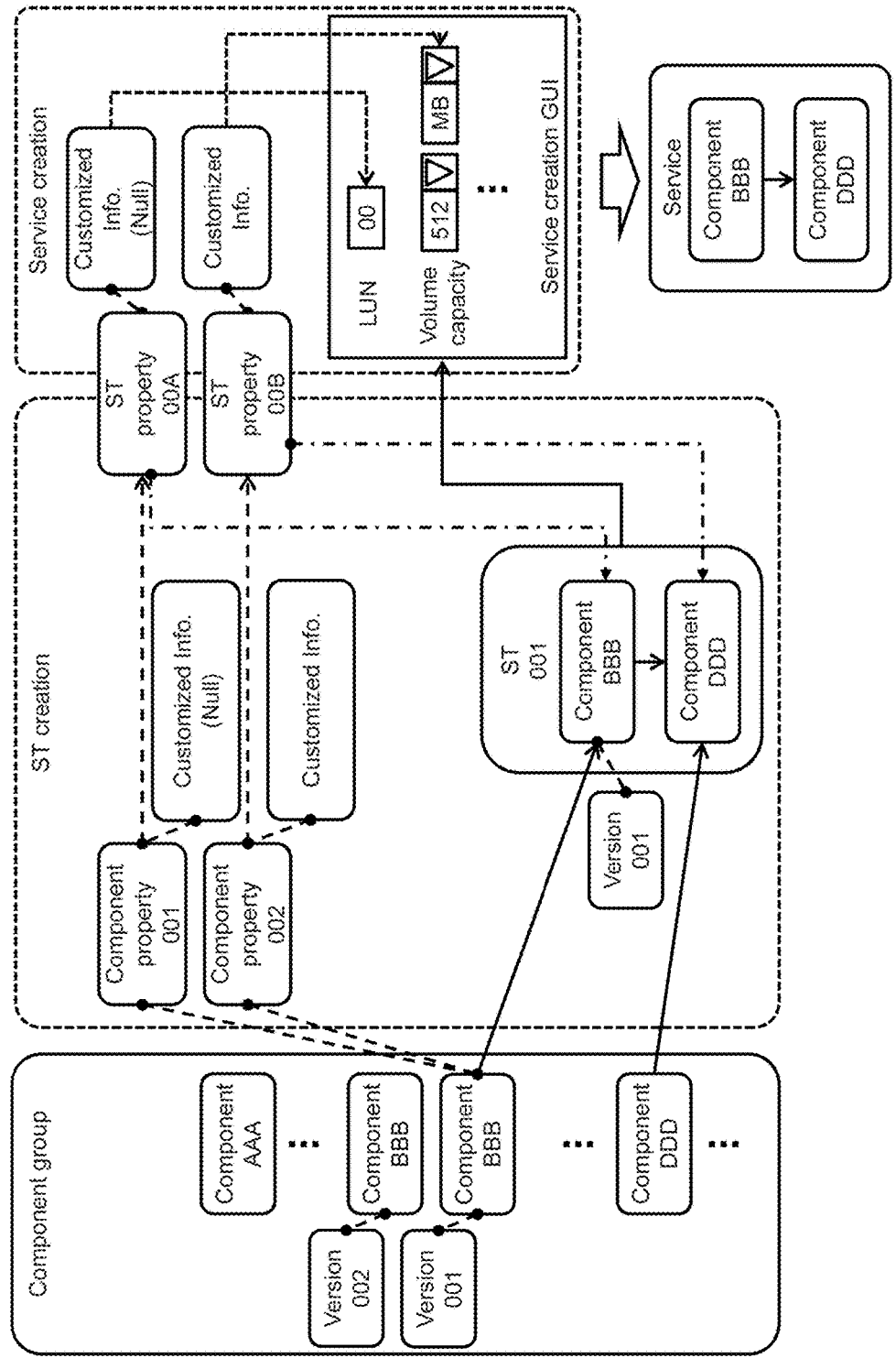
FIG. 1 illustrates a first overview of an embodiment.

One embodiment is now described. The embodiment described below is not intended to limit the invention in the claims, and not all of various elements and combinations thereof described in the embodiment are always necessary for the solution of the invention.

In the following description, information is sometimes described with the expression "kkk table". Information, however, may be expressed by another data configuration than the table. At least one of the "kkk tables" can be referred to as "kkk information" in order to indicate that the information is independent of the data configuration. The configuration of tables is illustrative. Two or more tables may be integrated into one table, or one table may be divided into a plurality of tables.

In the following description, processing is sometimes described with "program" as the subject. A program, however, is executed by a processor (such as central processing unit (CPU)) to implement predetermined processing with appropriate use of storage resources (such as memory) and/or a communication interface device (such as communication port). The subject of processing may therefore be a processor. Processing described with a program as the subject may be regarded as processing implemented by a processor or an apparatus including a processor. A processor may include a hardware circuit configured to implement a part or all of processing. A program may be installed to each controller from a program source. Examples of the program source include a program distribution computer or a computer readable storage medium.

The following embodiment includes a first management system (hereinafter referred to as "computer management system") configured to manage a computer system and a second management system (hereinafter referred to as "operation automation system") configured to support automation of system operations. The computer management system and the operation automation system may be a single management system. The computer management system may be included in an operation target apparatus.

In the following description, the management system may be configured by one or more computers. Specifically, for example, when a management computer displays information (specifically, when a management computer displays information on its own display device or a management computer transmits display information to a remote display computer), the management computer is a management system. For example, when similar functions to the management computer are implemented by a plurality of computers, the plurality of computers (may include a display computer when information is displayed on the display computer) are the management system. In this embodiment, a management server of an operation automation system is a management computer, and a management client of the operation automation system is a display computer.

The management computer includes an interface device coupled to an I/O system including a display system, a storage resource (for example, a memory) configured to store information therein, and a processor coupled to the interface device and the storage resource. The display system may be a display device included in the management computer or may be a display computer coupled to the management computer. The I/O system may be an I/O device (for example, a keyboard and a pointing device, or a touch panel) included in the management computer or may be a display computer or another computer coupled to the management computer. "Displaying display information" by the management computer refers to displaying display information on the display system, and this operation may be displaying display information on the display device included in the management computer or may be transmitting display information to the display computer from the management computer (in the latter case, display information is displayed by the display computer). Inputting and outputting information by the management computer may be inputting and outputting information via the I/O device included in the management computer or may be inputting and outputting information via a remote computer (for example, a display computer) coupled to the management computer. Outputting information may be displaying information.

In the following description, the expressions "uk (unique key)" and "key name" are used as element identification information. Other types of identification information (for example, number) may be used in place of or in addition to at least one of the "uk (unique key)" or the "key name".

Figure 2:
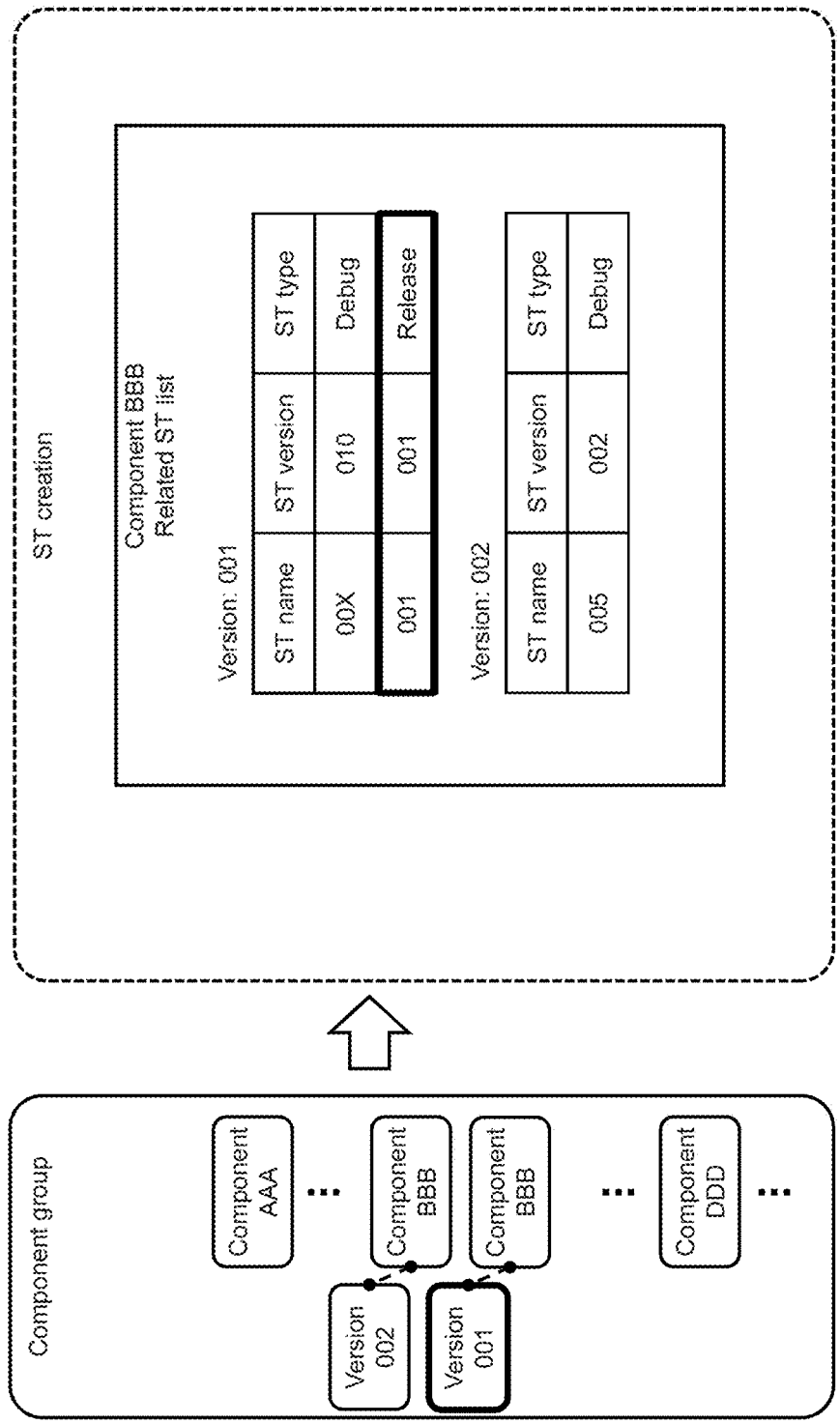
FIG. 2 illustrates a second overview of the embodiment.

FIG. 1 illustrates a first overview of the embodiment. FIG. 2 illustrates a second overview of the embodiment.

The operation automation system manages a large number of components for system operation. The "system operation" as used herein refers to operation of a computer system. The "component" is a part of the system operation, and is single independent processing (task). The component is a single unit associated with a service template (a single unit included in a service template). Examples of the component include a plugin component and an ST component (a service template treated as a component). Details are described later.

The plugin component is, for example, a processing module for executing a script, and may be an executable file. Plugin components are provided in the operation automation system in advance, but without being limited thereto, plugin components may be added to the operation automation system later. A plugin component may be, for example, a component for executing a configuration change of a storage apparatus (for example, a creation of a logical volume), but without being limited thereto, a plugin component may be a component used to combine components or may be a general-purpose component. Examples of the plugin components include a software component for repeated execution, a file transfer component, and a file executable component.

Possible cases include when a component (package) is downloaded and imported from outside the operation automation system, when a user of the operation automation system creates or improves a component, and when a service template is a component. Other than that, components may be imported by the operation automation system. As a component improvement example, at least one of the following is conceivable: (1) a bug fix in a component; (2) an improvement in internal processing efficiency; (3) a change in apparatus to be operated by a component (for example, the case where the specifications of a command for managing an apparatus have been changed and it becomes necessary to change a component that executes the command as well); (4) an increase in number of apparatuses to be operated by a component (for example, the case where a new second vendor apparatus in addition to a first vendor apparatus can now be operated); (5) a variation in number of input/output properties of a component; (6) a change in format of a value to be given to an input/output property of a component; (7) a change or addition of a default value with which a component is associated; or (8) an increase in number of processing contents of a component or an improvement in processing efficiency.

The operation automation system manages a large number of components (component group). In this embodiment, a service template (ST) is created based on two or more components among a large number of components, a service is created based on the created ST, and the created service is executed. Overviews of component management, ST creation, ST decision, service creation, and service execution are now described.

<Component Management>

The operation automation system manages a large number of components (component group). Components may be added or edited by a component providing user. The operation automation system manages, for each component, one or more component properties associated with the component. The operation automation system further manages, for each component, the versions of the component. FIG. 1 illustrates component properties and versions of a component BBB as an example, but other components are also associated with component properties and versions of the other components.

"Component property" is a property of a component. There are two types of the component properties: component input property and component output property. The component input property is a property that is related to the input of a value for a defined item (display name), and the component output property is a property that is related to the output of a value for a defined item (display name). Each component is associated with at least one of one or more component input properties or zero or more component output properties. In other words, some components are associated with zero output properties, but each component is associated with one or more input properties. For example, the input value may be a copy of a value that is input as a property of a service created in the past or may be a copy of a value that is output for another component already executed. The output value may be, for example, configuration information after a component is executed.

The component BBB with version 001 and the component BBB with version 002 are each managed. That is, even the same component is treated as different components as long as the "versions" are different. In other words, even when a component is updated (for example, improved), the updated component is not overwritten by the component before the update, but the updated component is managed separately from the component before the update. In updating a component, if the component before the update is automatically replaced with the updated component as represented by a so-called software update, a trouble may occur in operation automation. In particular, if the component before the update is an element of the service already created, a trouble may more easily occur. To address this, in this embodiment, when a component is updated, the operation automation system maintains a first type of identification information (for example, a component name) of the updated component to be the same as a first type of identification information of the component before the update, but changes at least one of the version or second identification information (for example, a component uk (component unique key)) of the updated component to be a different value from the version and second identification information of the component before the update. In this manner, the operation automation system can manage the updated component and the component before the update as separate components.

"Component providing user" is a user of an operation automation system 301 who, for example, adds or updates components. The component providing user can create, add, or update components via, for example, a GUI (graphical user interface), a CLI (common language infrastructure), or an API (application programming interface). A component to be added or updated by the component providing user may be typically a plugin component. Note that the plugin component is created by, for example, a vendor of a management program 431 or a vendor of an operation target apparatus. A service template can be associated with either of the plugin component or the ST component. The plugin component may be a minimum unit, and the ST component may be a package including one or more plugin components and a service template associated with the one or more plugin components. The plugin component may include a component input property and a processing content to be executed based on an input value that is input to the component input property. The ST component may also include a component input property and a processing content to be executed based on an input value that is input to the component input property. The component input property of the ST component may be an ST input property to be described later.

<ST Creation>

The operation automation system displays an ST creation screen. An information input UI is displayed on the ST creation screen. An ST creating user inputs information on the ST creation screen through user operation. For example, the operation automation system receives a selection of two or more components among a large number of components and a designation of the execution order of the two or more components via the ST creation screen. The operation automation system creates a service template for a service flow based on the two or more selected components and the designated execution order.

"ST creating user" is a user of the operation automation system 301 who creates a service template. The ST creating user creates a service template by using the ST creation screen as described above. The ST creating user may be the same as or different from the component providing user. Note that the above-mentioned ST component may be typically a component converted from a service template that has been created and verified by the ST creating user. However, the ST component may be created by another vendor or user.

"User operation" is an operation performed on a screen by a user by using an input device. In general, the input device used for the user operation is a combination of a pointing device (for example, a mouse) and a keyboard, or a touch screen. The input via the screen is performed by the user operation.

"Service template" is a template of a service. In this embodiment, the service template is sometimes abbreviated as "ST". It can be also said that the ST is an object indicating an uninstantiated automatic execution content.

"Service flow" is typically a sequence of two or more selected components. The sequence of the components follows the designated execution order. When the number of selected components is only one, the number of components constituting a service flow is also one.

As described above, the operation automation system creates a service template based on two or more components and their execution order that are selected and designated via the ST creation screen. Specifically, for example, the operation automation system creates a plurality of ST properties (for example, ST properties 00A and 00B) respectively corresponding to a plurality of component properties (for example, component properties 001 and 002) associated with two or more selected components, and associates the plurality of created ST properties with a service template (for example, ST001). The ST properties corresponding to the component properties are automatically created by the operation automation system based on the corresponding component property. The ST property may include a value that is input by the user operation during or after the creation of the ST property, but the ST property may be created without any input by the user operation (that is, manual input). "ST property" is the property of an ST. The ST property has two types: ST input property and ST output property. The ST input property is a property that is related to the input of a value for a defined item (display name), and the ST output property is a property that is related to the output of a value for a defined item (display name). Each service template is associated with at least one of one or more ST input properties or zero or more ST output properties. In other words, there is not always one ST output property.

In the example of FIG. 1, the service flow is a combination of the component BBB "Provisioning volume" (to create a logical volume in storage apparatus) and the component DDD "Create pair volume" (to create a logical volume (secondary volume) to be paired with the logical volume (primary volume)). Then, the service template (STOOL) for the service flow is created.

<ST Decision>

When the operation automation system receives a decision of a created service template through user operation, the operation automation system manages the ST type of the created service template as "Release" (see FIG. 2). The ST type "Release" means that the service template is decided and a service can be created based on the service template. On the other hand, a service template which has not been decided has the ST type "Debug". The ST type "Debug" means that the service template is being edited. Note that the operation automation system may be configured not to receive a selection of a service template whose ST type is "Debug" in the execution of a service (for example, a service template whose ST type is "Debug" is not displayed in a selectable manner (disabled)). As an example, a service creating user to be described later may be allowed to create a service from only a service template whose ST type is "Release", and the service template creating user may be allowed to create a service from both of a service template whose ST type is "Release" and a service template whose ST type is "Debug" for test purposes. It should be understood that the operation automation system recognizes users in order to implement such processing.

<Service Creation>

The operation automation system manages the created service template. The operation automation system receives a selection of any one of the service templates with the ST type "Release" from the service creating user, and displays a service creation screen on the basis of the selected service template. The service creating user inputs information on the service creation screen through the user operation. The operation automation system creates a service on the basis of the information input via the service creation screen.

"Service creating user" is a user who creates (executes) a service. The service creating user and the ST creating user may be different users or may be the same user.

"Service" is an instantiated service template. Specifically, the value necessary to execute a service is left blank in the service template, and when the necessary value is input to the service template, a service is created. Note that the value necessary to execute a service may be set as information whose default value is an ST property.

Note that the service is sometimes referred to as "operation service" in order to express that the service relates to operation. Note that the "service" in a specific situation can be regarded as representing operation processing to be executed on an operation target apparatus designated by a user. For example, this expression corresponds to when an ST input property 1304C is designated in the example of FIG. 13. In a case where an operation target apparatus to be designated is embedded in a component itself or a default value is not given to an input property of a component, the relation between "service" and "service template" can be regarded in the following another viewpoint. With the processing contents represented by "service", the operation target apparatus to be subjected to a configuration change or designated as an information acquisition source is clear because the input value is defined. However, the operation target apparatus to be designated is unclear with the "service template".

Note that the operation automation system may associate a service property with a created service. "Service property" is an input/output property (property for at least one of input or output) of the service. At least one of the value that is input to the service template in the service creation or the value that is output from the component in the service execution is set to the input/output property of the service. Specifically, for example, in the service execution, the value that is input to the input property in the service creation may be input to the component associated with the service template of the service, thereby executing processing. Further, the value output from the component may be set to the output property of the service so that the set value (for example, configuration information after the component is executed) is displayed on a service execution result screen.

<Service Execution>

The operation automation system transmits an instruction to execute a created service to the computer management system. The computer management system executes the service in accordance with the instruction.

The above description is about the overviews of the component management, the ST creation, the service creation, and the service execution.

Each of at least one ST input property among a plurality of ST properties is associated with customized UI generation information, which is information that defines a customized UI. Note that the customized UI generation information for a default UI is "Null" (information for default UI). A customized UI and a default UI are described later. In the drawings, the "customized UI generation information" is sometimes abbreviated as "customized Info.". The customized UI generation information of the ST property is UI generation information that is associated with a component property corresponding to the ST property (for example, information including information necessary to generate a UI). Each of at least one component input property among a plurality of component properties may be associated with customized UI generation information.

The operation automation system can display the screens, such as the ST creation screen and the service creation screen, in a sequential manner. A UI is displayed on at least one screen. In this embodiment, a UI is one element displayed on the screen. The screen including one or more UIs can be referred to also as "GUI". Note that a UI is sometimes referred to as "UI element" in the following description.

<Generation and Display of UI>

In this embodiment, the operation automation system generates a UI to be displayed on at least the service creation screen in the following manner, for example.

Specifically, the operation automation system generates a plurality of UIs based on a plurality of pieces of customized UI generation information respectively corresponding to a plurality of ST properties of the selected service template. The operation automation system displays the plurality of generated UIs on one service creation screen. In this embodiment, one UI is generated based on one customized UI generation information. In other words, the customized UI generation information and the UI have a 1:1 relation. The relation between the customized UI generation information and the UI, however, may be n:1, 1:n, or m:n (m and n are integers of 2 or more).

According to such UI generation, for example, even when a component DDD is replaced with a component EEE in a service flow constituted by a component BBB and the component DDD, a UI for the component EEE is generated and displayed in place of a UI for the component DDD as the UI to be displayed on the service creation screen after the replacement of components. As described above, UIs are generated with efficiency.

<Customized UI>

In this embodiment, a customized UI is prepared as a UI in place of or in addition to the default UI.

"Default UI" is a key-value UI with a text field. Specifically, the default UI is a pair of the display name of an ST property (component property) and a text field. Note that the reason why a text field is employed in the default UI is that the text field supports a wide variety of input forms. A text field is displayed irrespective of the display name (input item) of the ST property (component property). A user therefore needs to consider information such as the value or name to be input by looking at the display name, and needs to input the information in the text field by typing keys. Accordingly, an erroneous input, such as a typo, may occur. Even when a value, name or the like is invalid for an ST property (component property), such an invalid value, name or the like may be input. Users may be required to have advanced knowledge.

In contrast, "Customized UI" is a UI that takes usability into consideration rather than a key-value UI with a text field. For example, the customized UI is a UI including one or more GUI elements (widgets), such as at least one of the display name of an ST property (component property), a pull-down menu, a checkbox, or a radio button. Therefore, an erroneous input less often occurs with the customized UI than the default UI, and the user is not required to have advanced knowledge. Note that the customized UI may include a text field as well, but the customized UI is a UI with higher usability (for example, a UI including a list of invalid values, names or the like that is displayed close to a text field) than a UI such as the default UI (a key-value UI with a text field).

According to the example in FIG. 1, a default UI (a set of the display name: LUN and the text field) and a customized UI (a set of the display name: Volume Capacity, a pull-down menu for the volume capacity, and a pull-down menu for the unit of the volume capacity (for example, megabytes (MB))) are mixed in the single service creation screen. As described above, in this embodiment, not all of the UIs are required to be customized UIs. Even when a component that is not associated with a customized UI and a component that is associated with a customized UI are mixed in a single service flow, a customized UI as well as a default UI is displayed on the service creation screen as defined. There is a large number of components for system operation, and hence if components are provided after all UIs are changed to customized UIs, it takes time for a vendor of the operation automation system to provide its own product. According to this embodiment, even when a component that is not associated with customized UI generation information for a customized UI is early provided or when the ST creating user creates a component on his/her own and embeds the component in a service template, the service creating user can benefit a customized UI in the service creation.

Note that even when a customized UI is added to a component property (ST property) or when an old customized UI is changed to a new customized UI, the UI before the change (that is, the default UI or the old customized UI) is displayed on the screen. Specifically, for example, when the operation automation system receives a request to change the UI of the component associated with the existing ST, the operation automation system creates a copy of the component for which the UI change request has been received (creates a new component with a different version based on the existing component), and creates a component whose UI has been changed. Next, the operation automation system creates a copy of the existing ST (creates a new ST with a different version based on the existing ST), and replaces the existing component with a new component whose version is different from that of the existing component, in the created new ST. If the UI that is associated with the component used for the existing ST is automatically changed, the ST that has originally functioned well may no longer be used (for example, a value that has originally been successfully input can no longer be input). According to this embodiment, the UIs of the component can be replaced without adversely affecting a usable ST.

Even when a UI that is associated with a component property of a component associated with a created service template is changed and a new component is added, the operation automation system uses the existing component to display the UI before the change on the service creation screen based on the service template. In this manner, it is possible to avoid a situation in which a value that has originally been successfully input can no longer be input due to the change of the related UI after the creation of the service template. A specific example of generating a UI before change and maintaining display of this UI is described later with reference to FIG. 26.

<Display of Component Version and Related ST>

As described above with reference to FIG. 1, the operation automation system manages the relation between the version of a component and a service template (related ST) associated with the component of this version. During the creation of a service or before the start of creating a service, when the operation automation system receives a selection of a component (for example, the component BBB) from the user, the operation automation system displays a related ST list for each version of the selected component as illustrated in FIG. 2. The related ST list has related ST information (for example, the ST name, the ST version, and the ST type) for each related ST. In this manner, at least one of the following features (A) and (B) can be implemented.

(A) When an updated component is imported, the user can select a component before the update to know whether the component before the update has a related ST or not based on the related ST list for each version of the component before the update. Further, when the component before the update has a related ST, the user can know the ST type of the related ST as well. The user can determine whether or not to replace the component associated with the existing service template with the updated component based on the presence/absence of the related ST and the ST type. For example, when no related ST is present for the component before the update, the user can determine that it is unnecessary to replace the component associated with the ST with the updated component. For example, when a related ST whose ST type is "Release" is present for the component before the update (for example, the component BBB with version 001), the user can determine that a trouble may occur if the component before the update associated with the related ST is replaced with the updated component, and that it is therefore necessary to create a new ST by replacing the component before the update with the updated component. For example, when a related ST is present for the component before the update but a related ST whose ST type is "Release" is absent (for example, the component BBB with version 002), the user can determine that the component before the update associated with the related ST can be replaced with the updated component.

(B) The user can know, based on a related ST list for each version of a selected component (for example, the component BBB), the presence/absence of a related ST for the selected component and the ST type of the related ST. The user can determine, based on the presence/absence of a related ST and the ST type, the influence caused by updating the selected component (for example, the necessity of preparing a component with a new version, the necessity of replacing a component that is associated with a related ST, or the necessity of creating a new ST). For example, when a related ST whose ST type is "Release" is absent for the selected component, the user can determine that the selected component can be updated without changing the version of the component (that is, the component itself may be replaced without adding a component with a different version). Further, for example, when a related ST whose ST type is "Release" is present for the selected component, the user can determine that a component having a new version for the selected component needs to be prepared as the updated component.

It is generally desired to prevent, even when a component is updated (the version is upgraded), a component that is associated with the decided service template from being replaced with the updated component. According to this embodiment, as described above, a list representing which service template the component with each version is associated with is displayed. Consequently, it becomes easy to determine a service template which is associated with a component that is required to be replaced with the updated component or a component that is not allowed to be replaced with the updated component.

<ST Version Upgrade>

In this embodiment, even when a component with a new version for any component associated with a service template (ST) is added to a component group, the version of the ST is not automatically upgraded. Specifically, the component associated with the ST is not automatically replaced with the added new component. The version of the ST is upgraded in response to an explicit request from the user. The ST is not automatically backed up, and hence the operation of a service created with use of the ST can be guaranteed.

In response to an explicit backup request from the user (for example, the ST creating user), the version of an ST designated by the request (hereinafter referred to as "designated ST") can be upgraded. "Designated ST version upgrade" is to cause the version of a target component associated with a designated ST or a copy of the designated ST to be different from the version of a target component already associated with the designated ST. "Target component" is a component whose version is to be changed. The target component may be a component selected by the user (for example, the ST creating user) or may be a component automatically selected by the operation automation system. A target component before version change and a target component after version change are the same components except that predetermined attributes such as the version (for example, version and uk) are different (for example, components having the same name).

The designated ST version upgrade may correspond to, for example, any of (a) replacing a target component of a designated ST itself with a target component with a different version, (b) associating components other than a target component of a designated ST with a copy of the designated ST, and associating a target component whose version is different from the version of the target component of the designated ST with the copy of the designated ST, thereby generating a new ST that is the copy of the designated ST but has a different version of the target component.

For example, the following case is also possible. That is, a new component is added, but the component is not associated with any ST and a component with a new version from the component is added. The component with the new version is associated with any ST. However, a problem is found in the execution (for example, a test) of a service using the ST, and accordingly the ST (or a copy of the ST) is associated with a component with an old version that has not been associated with any ST. Such a case may correspond to "designated ST version upgrade".

Thus, the designated ST version upgrade is typically to upgrade the version (for example, to the latest version) of a target component associated with a designated ST, but the case of downgrading the version of a target component associated with a designated ST can correspond to the designated ST version upgrade (for example, when a target component whose version has been downgraded has not been associated with any ST or when an ST (or an ST copy) after the version of a target component has been downgraded is an ST different from any created ST).

The operation automation system receives a version upgrade request that designates an ST (for example, a request associated with a uk of a designated ST), and in response to the version upgrade request, causes the version of a target component associated with the designated ST or a copy of the designated ST to be different from the version of a target component already associated with the designated ST.

Even for a component used in a plurality of STs, it may be desired to change the availability of version change (for example, version upgrade) of the component for each service template. Examples of the possible cases include when the version upgrade of a component can lead to unstable ST operation and hence unnecessary version upgrade needs to be avoided as much as possible for some STs but a component having the latest function needs to be used for a part of STs. This embodiment can support any of the cases. Note that it is conceivable to create a new ST by using a component whose version has been changed, but in this case, the ST creating user is required to perform the ST creation operation such as the setting of properties again from the beginning, which is inconvenient for the creator.

The designated ST version upgrade may be performed in response to a version upgrade request received by the operation automation system from the ST creating user who has created a designated ST via an interface. Specifically, for example, a plurality of ST creating users are registered in the operation automation system, and when the operation automation system receives a version upgrade request for a designated ST from a user other than the ST creating user of the designated ST, the operation automation system may upgrade the version of the designated ST irrespective of attributes of the user, may upgrade the version of the designated ST if the attributes of the user meet predetermined conditions, or may return a notice that the version cannot be upgraded to the user.

Figure 18:
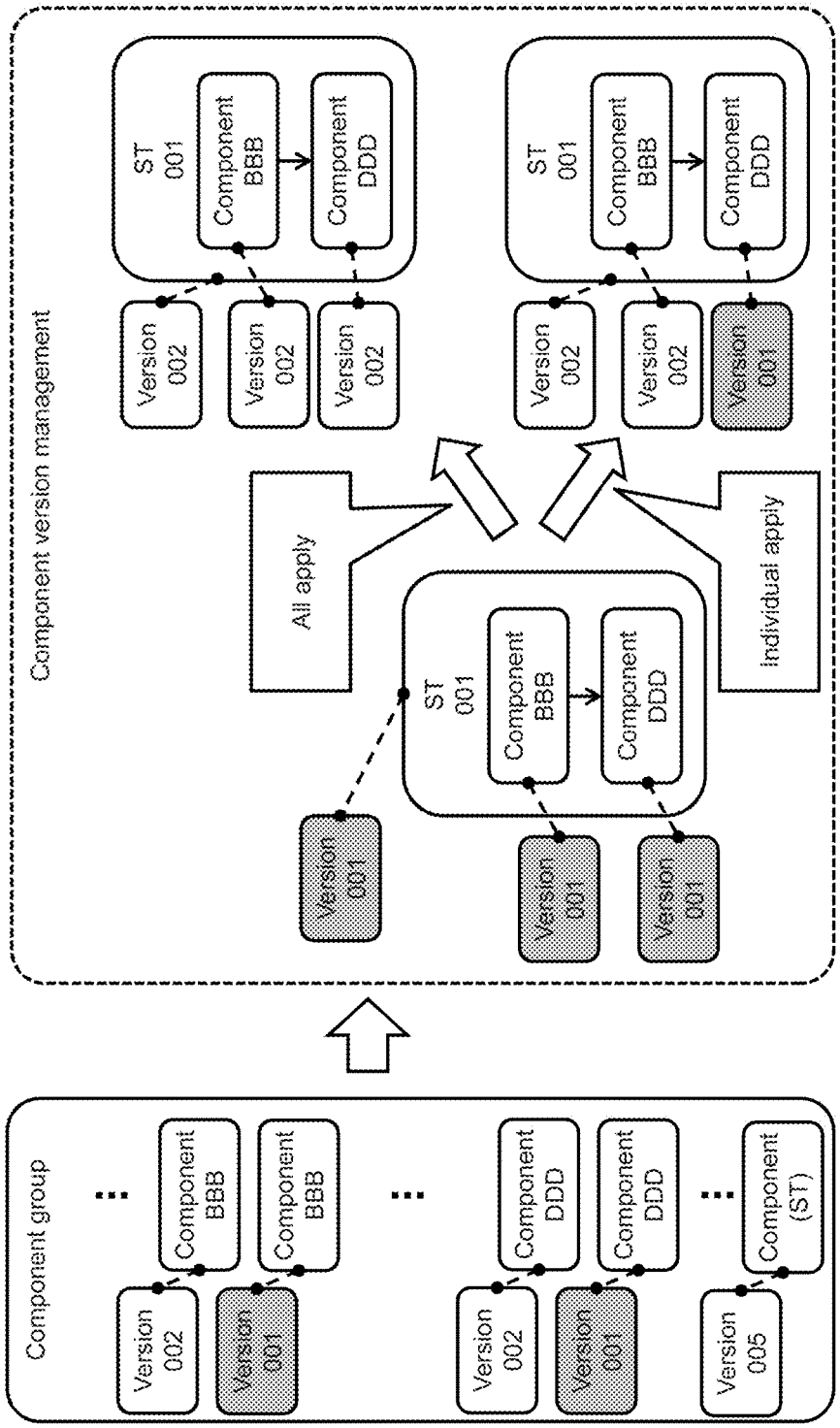
FIG. 18 illustrates a third overview of the embodiment.

FIG. 18 illustrates a third overview of the embodiment.

"Designated ST version upgrade" may include replacing a target component of a designated ST itself with a target component with a different version, but in this embodiment, the operation automation system maintains the designated ST itself, and creates a copy of the designated ST as a new version of the designated ST (note that the target component has a version different from that of a target component associated with the designated ST). Specifically, in the designated ST version upgrade, a target component with a different version is associated with a copy of the designated ST instead of a target component before version change.

As long as an ST before version upgrade can be already stably used, the ST is maintained (the ST itself is not updated), and hence the occurrence of a problem accompanying the ST version upgrade can be avoided. Further, it is easy to manage the version for using the ST as a component of another ST.

There are two modes of ST version upgrade: "All apply" mode and "Individual apply" mode. The "All apply" mode is a mode of replacing all components with old versions associated with a copy of a designated ST (a designated ST with a different version) with components with the latest version. The "Individual apply" mode is a mode of changing the versions of components selected by the ST creating user from among components associated with a copy of the designated ST.

For example, as illustrated in FIG. 18, a designated ST 001 (version 001) is associated with (includes) a component BBB (old version 001) and a component DDD (old version 001). For the component BBB, the component BBB with the latest version 002 exists. For the component DDD, the component DDD with the latest version 002 exists. The operation automation system receives, for the designated ST 001 (version 001), a selection of any one of the "All apply" mode and the "Individual apply" mode via a user interface (for example, a GUI). When the "All apply" mode is selected, the operation automation system replaces all components with old versions (component BBB (old version 001) and component DDD (old version 001)) associated with a copy of the designated ST 001 (STOOL with version 002) with components with the latest version (component BBB (latest version 002) and component DDD (latest version 002)).

When the "Individual apply" mode is selected, the operation automation system receives a selection of the component BBB (old version 001) and the changed version 002 via the user interface from the ST creating user. The operation automation system replaces the component BBB (old version 001) selected from among the components associated with the copy of the designated ST with the component BBB (changed version 002).

In this manner, the user can select whether the version of the ST is simply upgraded without selecting components individually or the version of the ST is upgraded by selecting components individually so as to meet the user's needs more satisfactorily.

The overview of the embodiment has been described above. The embodiment is now described in detail.

Figure 3:
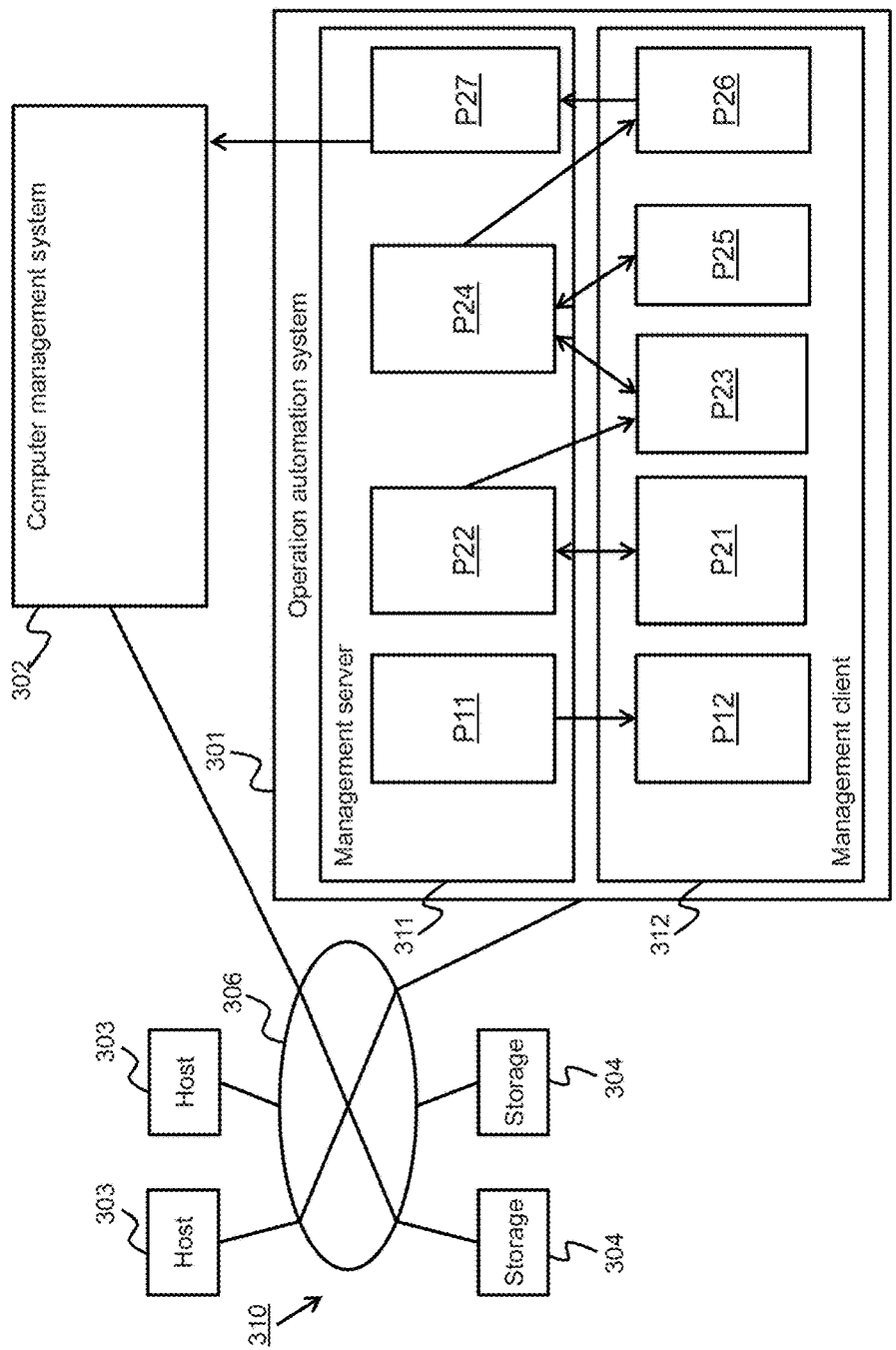
FIG. 3 illustrates a configuration of an overall system according to the embodiment.

FIG. 3 illustrates the configuration of the overall system according to the embodiment.

A computer management system 302 is coupled to a computer system 310. An operation automation system 301 is coupled to the computer management system 302. The operation automation system 301 may be integrated with the computer management system 302.

The computer system 310 includes one or more host computers (hereinafter referred to as "hosts") 303 and one or more storage apparatuses 304. The hosts 303 and the storage apparatuses 304 are coupled to one another via a communication network 306. Each host 303 includes a communication interface device (I/F) coupled to the storage apparatuses 304, a storage resource such as a memory, and a processor coupled to the I/F and the storage resource. Each storage apparatus 304 includes one or more physical storage devices (PDEVs) and a controller coupled to the one or more PDEVs. The controller provides a logical volume to the host 303. The host 303 transmits an input/output (I/O) request for designating the provided logical volume to the storage apparatus 304. The controller in the storage apparatus 304 inputs and outputs data to and from the logical volume in accordance with the I/O request. Data to be input and output is input and output to and from one or more PDEVs that are the base of the I/O destination area of the logical volume. Note that the host 303 and the storage apparatus 304 are an example of an operation target apparatus.

The computer management system 302 is a management system configured to manage the computer system 310. The computer management system 302 executes a service in accordance with an instruction from the operation automation system 301. Examples of the execution of the service include creation of a logical volume in the storage apparatus 304 and creating a secondary volume in the storage apparatus 304.

The operation automation system 301 is a management system configured to support automation of system operation. The operation automation system 301 includes a management server 311 and a management client coupled to the management server 311. The management client 312 displays information on the basis of display information transmitted from the management server 311 to the management client 312. In other words, the management server 311 displays information via the management client 312.

Specifically, for example, the management server 311 specifies a relation between the component and the related ST (P11), and displays a related ST list for each version of the component (P12).

For example, the management server 311 displays an ST creation screen (P21), and receives a creation (including an editing) of an ST from the ST creating user via the ST creation screen (P22). The management server 311 displays a service creation screen based on the decided ST (P23). The management server 311 receives information from the service creating user via the service creation screen, and creates and holds a service based on the input information (P24). The management server 311 may display a screen for editing the service (P25) so as to receive an editing of the service. The management server 311 displays an execution screen for the created (including edited) service (P26). The management server 311 receives an execution of the service from the service creating user via the service execution screen, and transmits the received instruction to execute the service to the computer management system 302 (P27).

Processing groups of processing P11, P12 and P21 to P 27 (one or more processing) illustrated in FIG. 3 are implemented by a processor executing a program group (one or more computer programs).

Figure 4:
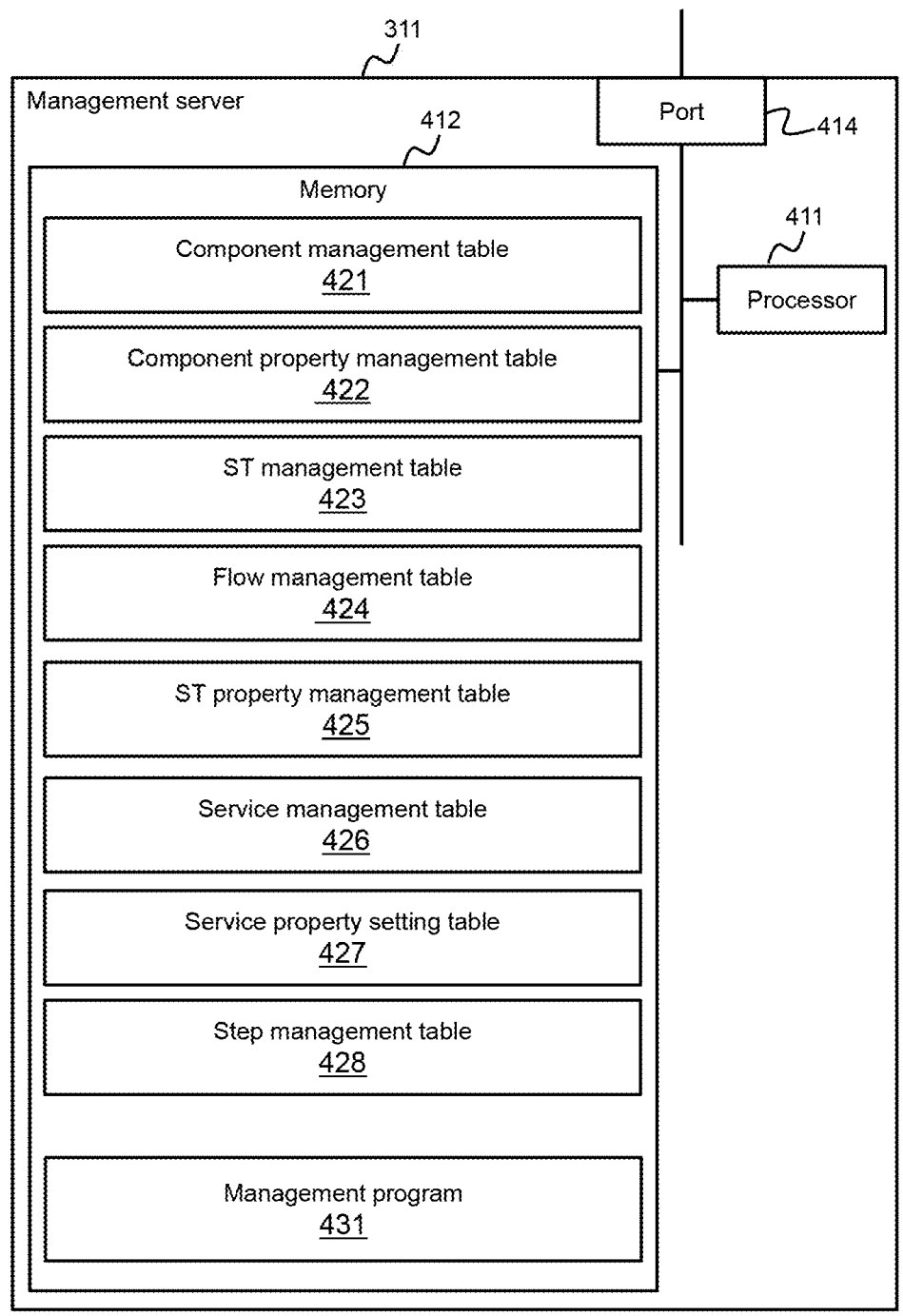
FIG. 4 illustrates a configuration of a management server.

FIG. 4 illustrates the configuration of the management server 311.

The management server 311 includes a communication port 414 (example of I/F), a memory 412 (example of storage resource), and a processor (typically, microprocessor such as CPU) 411 coupled to the communication port 414 and the memory 412. The management server 311 communicates with at least the computer management system 302 and the management client 312 via the communication port 414.

The memory 412 is not limited to a semiconductor memory and may be a hard disk drive. The memory 412 stores a computer program and a management table. Specifically, for example, the memory 412 stores a component management table 421, a component property management table 422, an ST management table 423, a flow management table 424, an ST property management table 425, a service management table 426, a service property setting table 427, a step management table 428, and a management program 431. The management program 431 is executed by the processor 411 to perform the processing P11, P12, P24, and P27 illustrated in FIG. 3, for example.

Figures 5, 6:
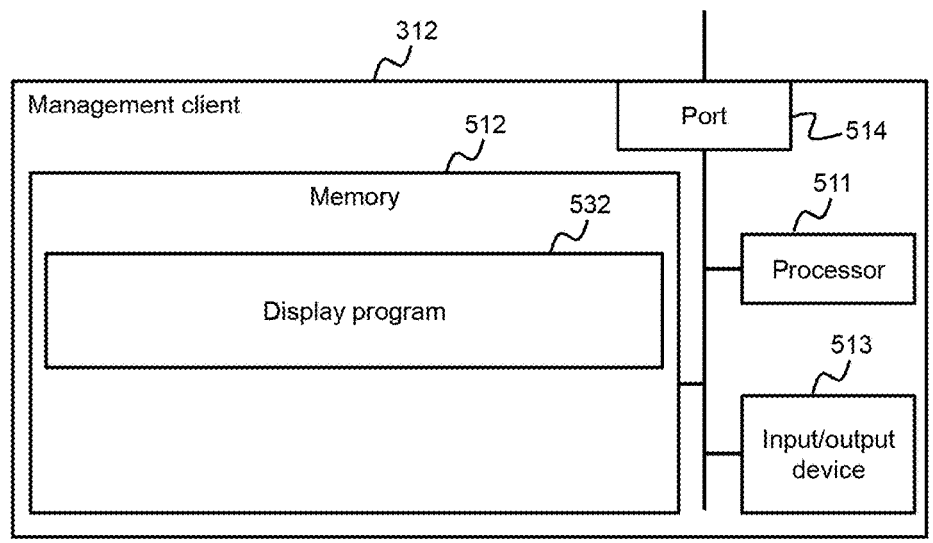
FIG. 5 illustrates a configuration of a management client.
FIG. 6 illustrates a configuration of a component management table.

FIG. 5 illustrates the configuration of the management client 312.

The management client 312 includes a communication port 514 (example of I/F), an input/output device 513, a memory 512 (example of storage resource), and a processor (typically, microprocessor such as CPU) 511 coupled to the communication port 514, the input/output device 513, and the memory 512.

The memory 512 is not limited to a semiconductor memory and may be a hard disk drive. The memory 512 stores a display program 531. The display program 531 is executed by the processor 511 to perform the processing P12, P21, P23, P25, and P26 illustrated in FIG. 3, for example.

The configuration of management information (tables 421 to 428) in the management server 311 is now described.

FIG. 6 illustrates the configuration of the component management table 421.

The component management table 421 has information related to components. The component management table 421 has a record for each component. A management number 601, a component name 602, a version 603, an executable file path 604, and a component uk 605 are stored in each record. The management number 601 is a serial number of the record. The component name 602 is the name of the component. The version 603 represents the version of the component. The executable file path 604 represents a path (path name) to the executable file of the component. The component uk 605 is a unique key (number) of the component. The uk is an example of identification information.

As understood from FIG. 6, the same components with different versions have the same component name 602 (for example, "Provisioning Volume") and different versions 603 (for example, "01.00.00" and "01.10.00"). In other words, the same components with different versions are managed as separate components. It is also understood that a plurality of components having the same component name 602 have the same original.

FIG. 7 illustrates the configuration of the component property management table 422.

The component property management table 422 has information related to component properties. The component property management table 422 has a record for each component property. A management number 701, a component uk 702, a display name 703, a key name 704, an initial value 705, an input/output type 706, a property group 707, and customized UI generation information 708 are stored in each record.

The management number 701 is a serial number of the record. The component uk 702 is a unique key of the component. The display name 703 is a component property name displayed on the screen, and corresponds to, for example, an input item or an output item.

The key name 704 is the name for uniquely identifying the component property, and is an example of identification information of the component property. The initial value 705 is a value to be set to a generated UI in advance. "Null" in the initial value 705 means that no initial value is present. In other words, when a UI is displayed, the input field or the output field is blank.

The input/output type 706 is information for distinguishing whether the component property is a component input property or a component output property (that is, whether the value on the UI is an input value or an output value). The value in the input/output type 706 is "In" when the corresponding component property is a component input property, and is "Out" when the corresponding component property is a component output property.

The property group 707 represents the name of a property group to which the component property belongs. Specifically, in this embodiment, at least one property group is present, and at least one of one or more component properties or one or more ST properties (for example, one or more ST properties respectively corresponding to the one or more component properties) are associated with the property group. The value "Null" in the property group 707 means that the corresponding component property does not belong to any property group.

The customized UI generation information 708 represents the type of a customized UI to be generated. The value "Null" in the customized UI generation information 708 means that the customized UI generation information is information for a default UI.

FIG. 8 illustrates the configuration of the ST management table 423.

The ST management table 422 has information related to service templates. The ST management table 423 has a record for each ST. A management number 801, an ST name 802, an ST version 803, an ST uk 804, a flow uk 805, and an ST type 806 are stored in each record.

The management number 801 is a serial number of the record. The ST name 802 is the name of the service template. The ST version 803 is a version of the service template. The ST uk 804 is a unique key of the service template. The flow uk 805 is a uk of a service flow corresponding to the service template. The ST type 806 represents the type of the service template. The value "Debug" in the ST type 806 means that the service template is editable, and the value "Release" in the ST type 806 means that the service template is decided (not editable).

As understood from FIG. 8, the same STs with different versions have the same ST name 802 (for example, "Provisioning & Pair") and different ST versions 803 (for example, "01.00.00" and "01.10.00"). In other words, the same STs with different ST versions are managed as separate STs. It is also understood that a plurality of STs having the same ST name 802 have the same original.

As described above, the versions of the component associated with the ST can be replaced with each other (that is, the component can be updated) when the ST with which the component is associated is undecided (Debug). In order to avoid a confusion caused by editing an ST that has already been present as a service (for example, an influence on a component associated with the ST), the management program 431 in this embodiment prohibits the decided ST (an ST whose ST type is "Release") from being returned to the editing status (Debug). When a request to edit the decided ST is received from the user, the management program 431 generates a copy of the decided ST, and displays the ST copy as an ST to be edited. As a modification, the management program 431 may permit even the decided ST from being returned to the editing status as long as there is no service in execution or in an execution queue (for example, as long as a service is not being created or has been created based on the ST), and may prohibit the decided ST from being returned to the editing status when the ST is decided and there is any service in execution or in an execution queue.

FIG. 9 illustrates the configuration of the flow management table 424.

The flow management table 424 has information related to service flows. The flow management table 424 has a record for each service flow. A management number 901, a flow uk 902, a component uk list 903, and a property mapping list 904 are stored in each record.

The management number 901 is a serial number of the record. The flow uk 902 is a unique key (number) of the flow.

The component uk list 903 is a list of uks of components constituting the service flow. In the component uk list 903, component uks are arranged in the order of arrangement of components in the service flow (in the execution order of the components).

The property mapping list 904 is a list of uks of service properties of a service corresponding to the service flow. In the list 904, the uk of the service property is, for example, a combination of the component uk and the key name of the component. Note that a combination of the component properties of the component uks, such as "{component uk(1).storage.pathinfo=component uk(2).storage.pathinfo}", means that an output value from one component is an input value to the other component.

FIG. 10 illustrates the configuration of the ST property management table 425.

The ST property management table 425 has information related to ST properties. The ST property management table 425 has a record for each ST property. A management number 1001, an ST uk 1002, an ST property uk 1003, a display name 1004, a key name 1005, an input/output type 1006, a property group 1007, and customized UI generation information 1008 are stored in each record.

The management number 1001 is a serial number of the record. The ST uk 1002 is an ST uk of an ST with which the ST property is associated.

The ST property uk 1003 is a unique key (for example, a number) of the ST property.

The display name 1004 is an ST property name to be displayed on the screen. The key name 1005 is the name for uniquely identifying the ST property, and is an example of identification information of the ST property.

The input/output type 1006 is information for distinguishing whether the ST property is an ST input property or an ST output property (that is, whether the value on the UI is an input value or an output value). The value in the input/output type 1006 is "In" when the corresponding ST property is an ST input property, and is "Out" when the corresponding ST property is an ST output property.

The property group 1007 represents the name of a property group to which the ST property belongs. Specifically, as described above, in this embodiment, at least one property group including Null described later is present, and at least one of one or more component properties or one or more ST properties are associated with the property group. The value "Null in the property group 1007 means that the corresponding ST property does not belong to any property group.

The customized UI generation information 1008 represents the type of a customized UI to be generated. The value "Null" in the customized UI generation information 1008 means that a default UI is associated with the corresponding ST property. Note that the customized UI generation information may include customized UI generation detailed information (for example, the number of widgets, the type of each widget, texts to be displayed, and a list to be displayed). The customized UI generation detailed information (not shown) may be associated with an ST property. A customized UI may be generated based on the customized UI generation detailed information associated with the ST property.

FIG. 11 illustrates the configuration of the service management table 426.

The service management table 426 has information related to services. The service management table 426 has a record for each service. A management number 1101, a service name 1102, a service explanation 1103, an ST uk 1104, and a service uk 1105 are stored in each record.

The management number 901 is a serial number of the record. The service name 1102 is the name of the service. The service explanation 1103 is an explanation of the service, and may include, for example, processing in the service and the order of the processing. The ST uk 1104 is an ST uk of an ST corresponding to the service. The service uk 1105 is a unique key (number) of the service.

FIG. 12 illustrates the configuration of the service property setting table 427.

The service property setting table 427 has information related to service properties. The service property setting table 427 has a record for each service property. A management number 1201, a property set value 1202, an ST property uk 1203, and a service uk 1204 are stored in each record.

The management number 1201 is a serial number of the record. The property set value 1202 is an input value (or an output value) of the corresponding ST property. "Null" means that no input value (or output value) is present. The ST property uk 1203 is an ST property uk of the corresponding ST property. The service uk 1204 is a service uk of the corresponding service.

It is understood from FIG. 12 that five ST properties are associated with the service whose service uk is "1", and the values such as "STORAGEHOST" and "1" are input (or output) to (or from) five UIs (at least one of a default UI or a customized UI) respectively corresponding to the five ST properties.

FIG. 19 illustrates a configuration of the step management table 428.

The step management table 428 includes information on steps. "Step" is an element of a service flow indicated by an ST. A component is associated with the element, and a service flow is constituted as a sequence of two or more components. One component corresponds to one or more steps in an ST. In other words, one component (the version may be the same or different) may be associated with a plurality of steps. In the description in this embodiment, a component associated with any ST can be referred to as "step". The step management table 428 has a record for each step. A management number 1901, an Outdated ST uk 1902, an Outdated ST version 1903, a step name 1904, a current component name 1905, a current version 1906, a latest component name 1907, a latest version 1908, and a status 1909 are stored in each record.

The management number 1901 is a serial number of the record. The Outdated ST uk 1902 is a uk of an ST to which steps belong and whose version can be upgraded. When the version of an ST associated with steps (hereinafter, "target ST" in the description with reference to FIG. 19) cannot be upgraded (for example, when every component associated with the target ST has only one version), the value of the Outdated ST uk 1902 is a value that means that the version cannot be upgraded (for example, "Null"). The step name

1904 is the name (for example, display name) of a step (for example, the same value as the display name 703 in FIG. 7). The current component name 1905 is the name (for example, display name) of a component (current component) associated with the step. The current version 1906 represents the version of the current component corresponding to the step. The latest component name 1907 is the name (for example, display name) of a component (latest component) with the latest version among current components corresponding to the step. The latest version 1908 represents the version of the latest component corresponding to the step. When there is no component with the latest version (in other words, when the current version is the latest version), the value of the latest component name 1907 and the value of the latest version 1908 are each a value that means that there is no component with the latest version (for example, "Null"). For a component after version change, the management program 431 can receive, for example, in changing the version of a component, an input of a component name different from a component name of the component before version change from the user, and associate the different component name with the component after version change. Thus, in the same step, the current component name 1905 and the latest component name 1907 may be different from each other. A component is used by not only the user who has created the ST but also another user (for example, an ST created by the ST creating user), and a general-purpose display name can be defined as the step name 1904. Specifically, the display name as the step may be defined separately from the display name of the component. The step is unique (the same step does not exist in a plurality of STs), and hence it can be said that the purpose of processing performed by the step is clearer than that of the component. For example, by setting values for properties of the step or defining the execution order, at least one of the concretization or the differentiation of processing contents can be implemented. By defining the display name of the step separately from the display name of the component, it can be expected that it becomes easier for the user to identify what kind of processing is performed on a service flow. The status 1909 represents whether or not the version of the step associated with the target ST has been changed. When the version has been changed, the value of the status 1909 is "Applied". When the version has not been changed or when there is no latest version, the value of the status 1909 is "Not applied".

The above description is about the configurations of the tables 421 to 428. Note that, in the above description, the identification information such as the display name, the key name, and the uk may be information input by the user or information determined by the management program 431.

An example of the detailed relation between the ST input property and the ST output property and an example of detailed UI generation/display are now each described.

Figure 13:
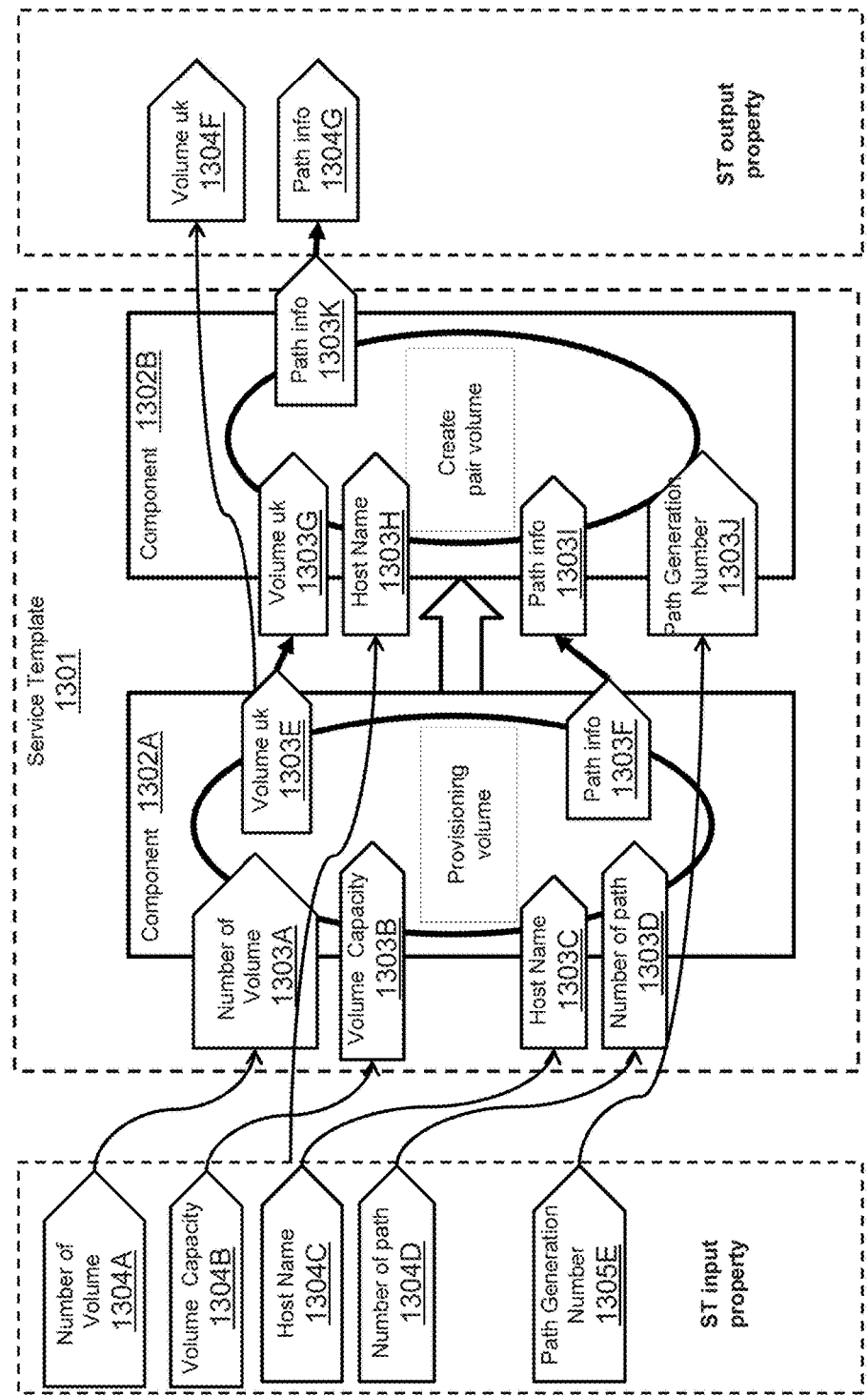
FIG. 13 illustrates an example of a relation between an ST input property and an ST output property.

FIG. 13 illustrates an example of the relation between the ST input property and the ST output property.

A service flow corresponding to a service template 1301 is constituted by a component 1302A ("Provisioning Volume") and a component 1302B ("Create pair volume"). The service flow has the execution order in which the component 1302B is executed next to the component 1302A.

The component 1302A is associated with four component input properties 1303A to 1303D. The display names of the four component input properties 1303A to 1303D are "Number of Volume", "Volume Capacity", "Host Name", and "Number of path", respectively. The component 1302A is associated with two component output properties 1303E and 1303F. The display names of the two component output properties 1303E and 1303F are "Volume uk" and "Path info", respectively.

The component 1302B is associated with four component input properties 1303G to 1303J. The display names of the four component input properties 1303G to 1303J are "Volume uk", "Host Name", "Path info", and "Path Generation Number", respectively. The component 1302B is associated with one component output property 1303K. The display name of the component output property 1303K is "Path info".

Of those component properties, the component output property 1303E whose display name is "Volume uk" and the component input property 1303G whose display name is the same "Volume uk" have the same key name. Similarly, the component output property 1303F whose display name is "Path info" and the component input property 1303I whose display name is the same "Path info" also have the same key name. Accordingly, the output value from the component output property 1303E is used as the input value of the component input property 1303G, and the output value from the component output property 1303F is used as the input value of the component input property 1303I. For "Volume uk" and "Path info", the output values are used directly as the input values in this manner, and hence the ST creating user is not required to input the values for "Volume uk" and "Path info". Consequently, an erroneous input can be prevented.

The service template 1301 for the service flow including the components described above is associated with ST input properties 1304A to 1304E and ST output properties 1304F and 1304G by the management program 431. The ST input property 1304A is an ST input property generated based on the component input property 1303A, and accordingly the display name thereof is "Number of Volume". The ST input property 1304B is an ST input property generated based on the component input property 1303B, and accordingly the display name thereof is "Volume Capacity". The ST input property 1304C is an ST input property generated based on the component input properties 1303C and 1303H, and accordingly the display name thereof is "Host Name". The ST input property 1304D is an ST input property generated based on the component input property 1303D, and accordingly the display name thereof is "Number of path". The ST input property 1304E is an ST input property generated based on the component input property 1303J, and accordingly the display name thereof is "Path Generation Number". The ST output property 1304F is an ST input property generated based on the component output property 1303E, and accordingly the display name thereof is "Volume uk". The ST output property 1304G is an ST input property generated based on the component output property 1303K, and accordingly the display name thereof is "Path info". Those ST input properties and ST output properties are generated by the management program 431 based on the component input properties and the component output properties.

Figure 14:
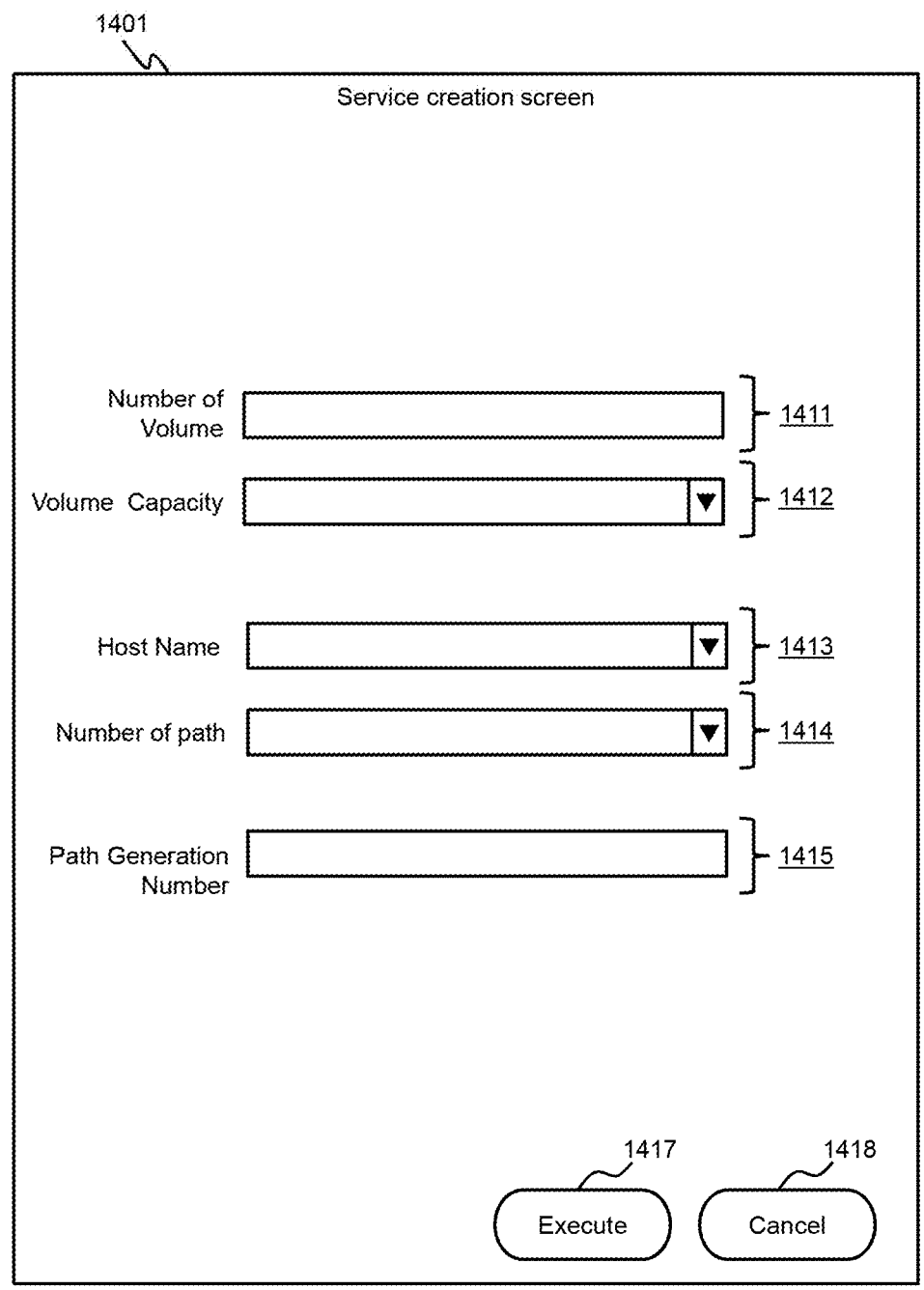
FIG. 14 is an example of a service creation screen corresponding to an ST in FIG. 13.

FIG. 14 is an example of the service creation screen corresponding to the ST in FIG. 13.

On a service creation screen 1401, UIs 1411 to 1415 respectively corresponding to the ST input properties 1304A to 1304E are displayed. Each of the UIs 1411 to 1415 is a UI generated by the management program 431. Of the UIs 1411 to 1415, the UIs 1411 and 1415 are default UIs and the UIs 1412 to 1414 are customized UIs. Each of the UIs 1411 to 1415 is generated based on customized UI generation information associated with the corresponding ST input property.

The service creation screen 1401 is provided with an execution button 1417 and a cancel button 1418. The ST creating user presses the execution button 1417 after confirming the values input to the UIs 1411 to 1415. In response thereto, a service is created based on the input values, and an instruction to execute the service is transmitted to the computer management system 302. For canceling the values input to the UIs 1411 to 1415, the ST creating user presses the cancel button 1418 so that all the UIs 1411 to 1415 become blank.

Note that whether the UI displayed on the service creation screen 1401 is a default UI or a customized UI depends on the customized UI generation information associated with the ST property of the ST, and hence all of the UIs displayed on the screen 1401 may be customized UIs.

Based on property groups to which the ST input properties 1304A to 1304E respectively belong, the management program 431 may display UIs for each property group. For example, two or more UIs belonging to the same property group may be surrounded by one frame. When ST properties in the same field belong to the same property group, UIs for the ST properties are arranged correspondingly to the property group. An improvement in visibility is expected by this arrangement.

Specific examples of the display in this embodiment are now described.

Figure 15:
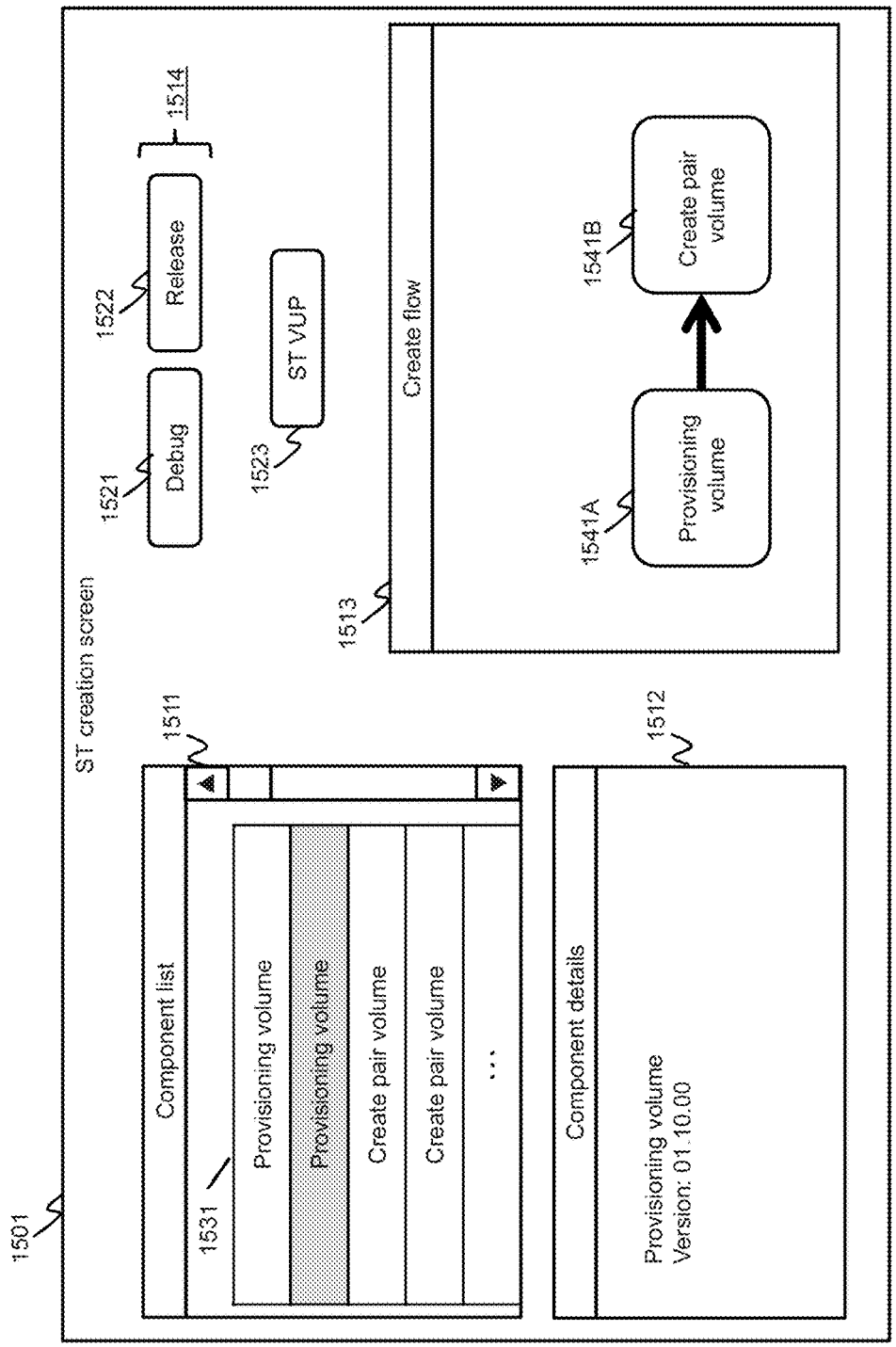
FIG. 15 illustrates an example of an ST creation screen.

FIG. 15 illustrates an example of the ST creation screen.

The ST creation screen includes a component list plane 1511, a component detail plane 1512, a flow creation plane 1513, an ST type selection tool 1514, and an ST VUP button 1523.

In the component list plane 1511, a component name list 1531 of managed components (component name list recorded in the component management table) is displayed by the management program 431.

In the component detail plane 1512, details (for example, the component name and version) corresponding to a component selected from the component list 1531 are displayed by the management program 431.

In the flow creation plane 1513, icons 1541A and 1541B for components selected from the component list 1531 are displayed in accordance with a user operation, and a service flow is defined based on the connection of the component icons 1541A and 1541B. For example, in accordance with a user operation of dragging and dropping components selected from the component list 1531 to the flow creation plane 1513, the management program 431 displays the icons 1541A and 1541B for the components on the flow creation plane 1513. Each time a component is dragged and dropped from the component list 1531, the management program 431 adds a component icon to the flow creation plane 1513. In accordance with the user operation, the management program 431 puts an arrow link from the first component icon to the second component icon, thereby defining that the second component is executed next to the first component.

The ST type selection tool 1514 includes a Debug button 1521 and a Release button 1522. When the Release button 1522 is pressed, the management program 431 saves the ST for the service flow displayed in the flow creation plane 1513 so that the ST type is "Release". When the Debug button 1521 is pressed, on the other hand, the management program 431 saves the ST for the service flow displayed in the flow creation plane 1513 so that the ST type is "Debug".

The ST VUP button 1523 is a button for instructing ST version upgrade. When the ST VUP button 1523 is pressed, the management program 431 displays an ST list screen (see FIG. 27) to be described later.

The above description is about the configuration of the ST creation screen 1501.

When a component is newly imported, the component name of the newly imported component is also included in the component list 1531 on the ST creation screen 1501. When the ST creating user selects the component name of the new component and performs a user operation for displaying a related ST (designates the selected component name as a target of the related ST display), the management program 431 displays a related ST list for each version on a popup, for example.

Figure 16:
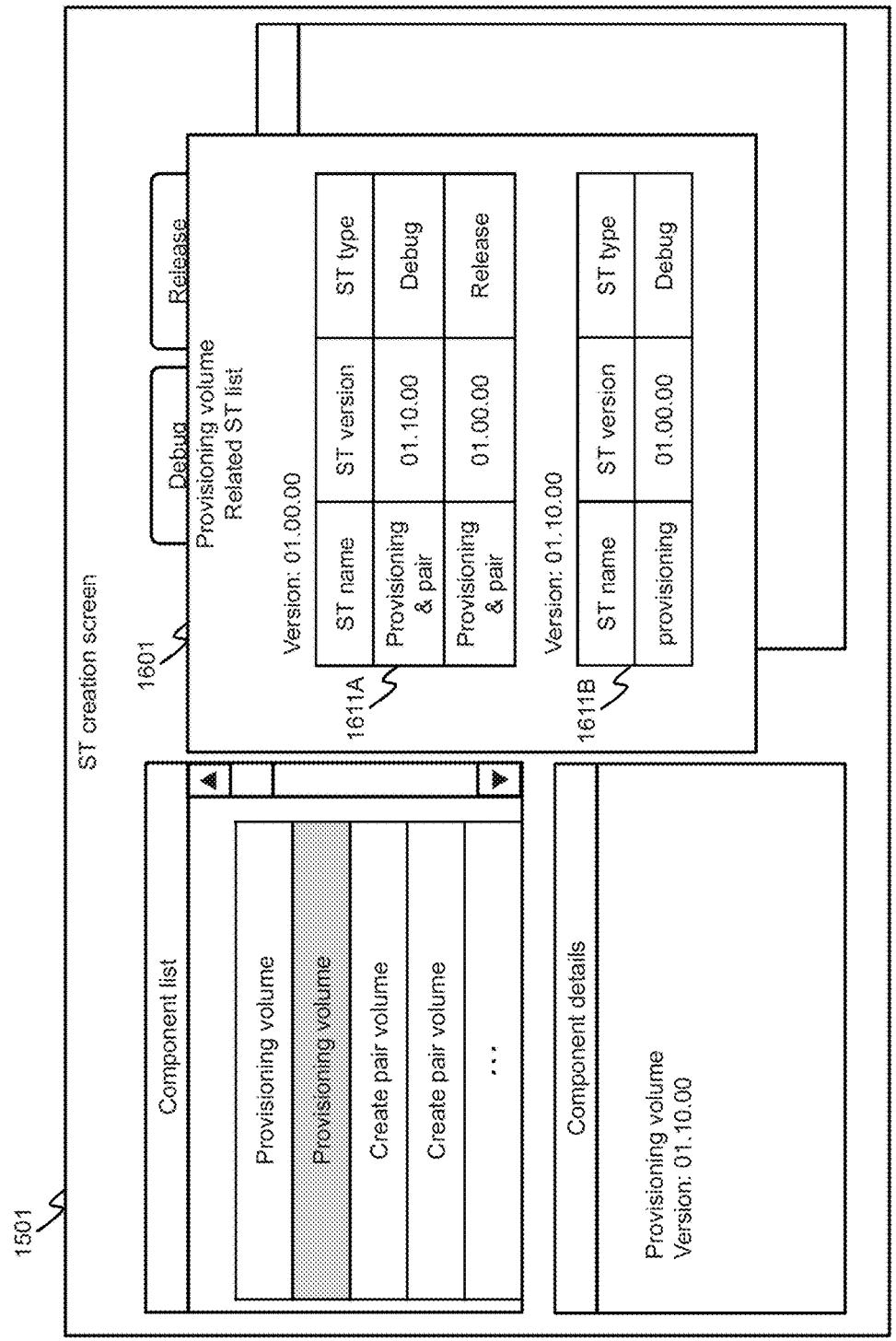
FIG. 16 illustrates an example of a related ST list for each version.

FIG. 16 illustrates an example of the related ST list for each version.

The management program 431 specifies, from the component management table 421, the version and component uk of the same component name as the component name selected from the component list 1531. The management program 431 specifies a flow uk corresponding to the specified component uk from the flow management table 424, and specifies the ST name and ST type corresponding to the specified flow uk from the ST management table 423. In this manner, the management program 431 generates and displays related ST lists (lists of the ST names, versions, and ST types of the related STs) 1611A and 1611B for the respective versions of the component selected from the component list 1531. Those lists 1611A and 1611B are displayed on a popup screen 1601 on the ST creation screen 1501, for example.

For example, when a new component is imported, the ST creating user generally considers whether the new component needs to be adapted to an existing ST that uses the component with the old version. In this case, if the user cannot grasp the relation between a component and an ST, the user cannot grasp which ST needs to be enhanced.

According to this embodiment, in regard to a component selected from the component list 1531, a related ST (an ST with which a component having the same component name as that of the selected component is associated) is displayed for each version. This enables the ST creating user to grasp the ST that uses the component having the same component name as that of the selected component. Consequently, when a new component is imported, the user can easily determine which service template needs to be replaced with the new component.

Note that the user operation for displaying a related ST list may be performed before the update of a component. For example, in order to determine whether or not to update a component, the ST creating user causes the management program 431 to display a related ST for the component. When it is found that there is no ST type "Release" for the component, the ST creating user may determine to update the selected component without updating the version. When it is found that the an ST type "Release" is present for the component, on the other hand, the ST creating user may determine to update the selected component together with the version.

By the way, as described above, a service can be created with use of the service creation screen based on an ST created with use of the ST creation screen 1501.

Figure 17:
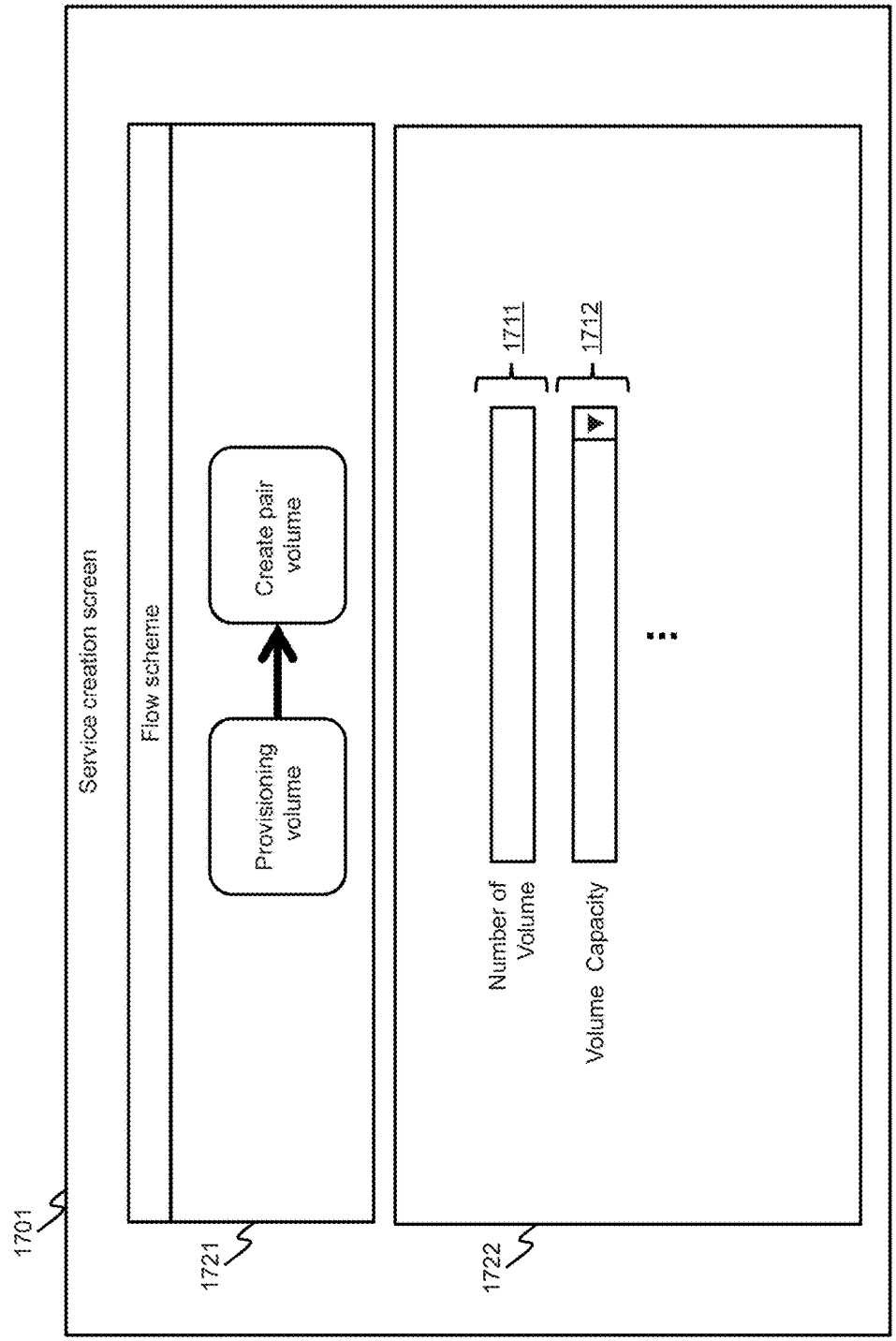
FIG. 17 illustrates a specific example of a service creation screen.

FIG. 17 illustrates a specific example of the service creation screen.

A service creation screen 1701 includes a flow scheme plane 1721 and a UI plane 1722. The management program 431 generates a schematic diagram of a service flow of a decided ST based on, for example, the flow management table 424, and displays the generated schematic diagram on the flow scheme plane 1721.

The management program 431 generates a UI based on customized UI generation information associated with an ST input property of the decided ST, and displays the generated UI on the UI plane 1722. For example, a default UI 1711 and a customized UI 1712 are mixed in the UI plane 1722 as illustrated in FIG. 17.

The customized UI has higher usability than the default UI and makes it easier for the service creating user to input the value. Accordingly, in the component list 1531 on the ST creation screen 1501 illustrated in FIG. 16, for example, whether or not valid customized UI generation information (customized UI generation information other than "Null") is associated with the component may be displayed in addition to the component name. When a plurality of components having the same component name include a component associated with a customized UI and a component not associated with a customized UI, the ST creating user selects the component associated with a customized UI as a component to be associated with the ST. In this manner, the user can create an ST whose values are easy to input in the service creation.

Note that, for example, a schematic diagram of the service flow of the ST may be displayed on the service creation screen 1701 as illustrated in FIG. 17.

Processing to be performed in this embodiment is now described.

Figure 20:
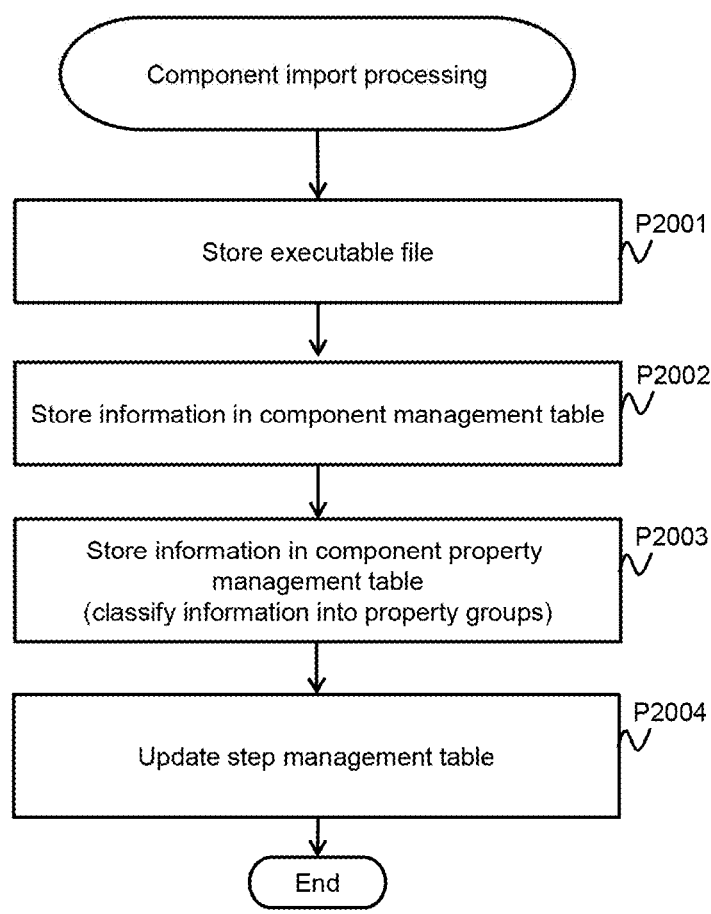
FIG. 20 is a flowchart of component import processing.

FIG. 20 is a flowchart of component import processing.

The management program 431 receives a component information package (for example, including an executable file and component properties), and stores the component executable file in the memory 412 (or an auxiliary storage apparatus such as an external storage apparatus) (P2001). The component information package may include a part or all of customized UI generation information.

The management program 431 stores information on the executable file, such as the path name, in the component management table 421 (P2002).

The management program 431 stores information related to the component properties in the component property management table 422 (P2003). Note that a part of attributes in the component property management table 422 may be added or changed by the component providing user or the ST creating user after the import. For example, it is not preferred that the display name 703 be confused with the display names of other components. Then, the arrangement of UIs can be grouped based on the property group, and hence the property group may be added or changed by the ST creating user.

The management program 431 updates the step management table 428 as needed (P2004). Specifically, for example, the management program 431 may search the step management table 428 for a step (component) with the old version of the imported component. When the step (component) with the old version is retrieved, the management program 431 may update the latest component name 1907 and the latest version 1908 corresponding to the retrieved step. When the value of the status 1909 corresponding to the retrieved step (component) is "Applied", the management program 431 may update the value to "Not applied". When the value of each of the Outdated ST uk 1902 and the Outdated ST version 1903 corresponding to the retrieved step (component) is "Null", the management program 431 may update the value of the Outdated ST uk 1902 to the uk of the ST associated with the retrieved step, and update the value of the Outdated ST version 1903 to the version of the ST associated with the retrieved step.

In this embodiment, the customized UI generation information is not present in the operation automation system 301 in advance (not built in the operation automation system 301), but is input along with the import of the component. In this manner, a UI suited to the imported component can be automatically added as an operation target of the operation automation system 301 at an appropriate timing of the import of the component.

Note that, even when a component has the same component name as the imported component, if the version of the component is different, the component import processing allocates a new component uk to the imported component in the component management table. This prevents a component that is used for an already created service template or service from being automatically changed. This advantage is as described above. However, even when the version of a component is different from the imported component, if the component has the same component name, the same component uk as that of the previous version may be allocated to the imported component so that a component that is used for an already created service template or service is automatically changed by the component import processing.

Figure 21:
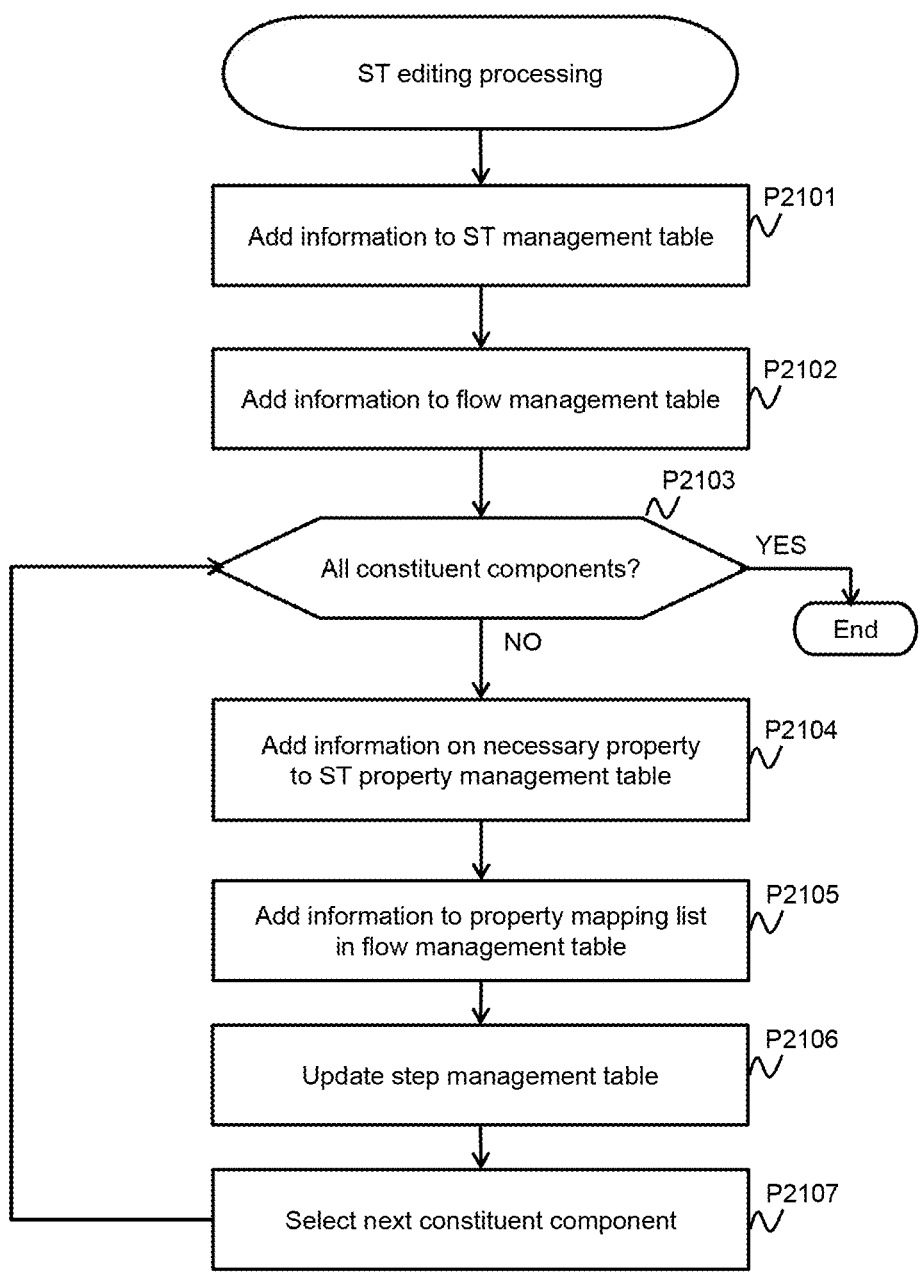
FIG. 21 is a flowchart of ST editing processing.

FIG. 21 is a flowchart of ST editing processing.

ST editing processing is processing in the ST creation processing. The ST creating user places necessary components on the flow creation plane 1513 on the ST creation screen 1501 to determine the order of components. The ST editing processing illustrated in FIG. 21 is processing for temporarily saving the ST for the service flow on the flow creation plane 1513.

The management program 431 stores information on the ST (such as the ST name, the ST version, and the ST uk) in the ST management table 423 (P2101). The management program 431 stores information on the service flow of the ST (such as the flow uk and the component uk list) in the flow management table 424.

The management program 431 performs P2104 to P2107 for each of all components indicated by the configuration component uk list of the service flow for the ST (for example, in the order of the components indicated by the configuration component uk list) (P2103). Specifically, the management program 431 stores information on an ST property corresponding to a component property of a component selected from the configuration component uk list in the ST property management table 425 (P2104). This processing includes storing the values of the customized UI generation information 708 and the property group 707 in the component property management table as the customized UI generation information 1008 and the property group 1007 in the ST property management table 425. In P2104, for example, the management program 431 determines whether or not the output property of the previous component and the input property of the next component can be associated with each other (whether or not the key names are the same), and when the result of determination is positive, may associate the output property and the input property with each other. The management program 431 adds information based on the ST property stored in P2104 to the corresponding property mapping list 904 (P2105). The management program 431 updates the step management table 428, for example, adds a record corresponding to the component (step) associated with the ST to the step management table 428 (P2106). Then, the management program 2104 selects the next component from among the components indicated by the configuration component uk list (P2107). Note that when an input property of a component is associated with an output property of another component, the registration in the ST property management table 425 may be omitted.

Figure 22:
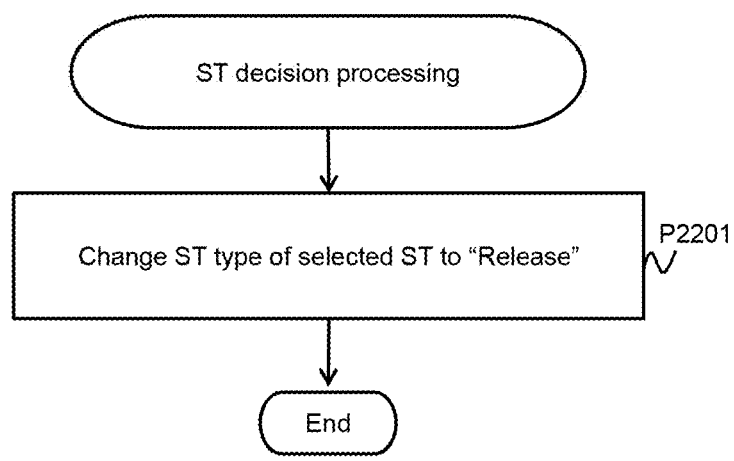
FIG. 22 is a flowchart of ST decision processing.

FIG. 22 is a flowchart of ST decision processing.

The management program 431 receives a designation of the ST type "Release" for an ST selected from among created (registered) STs, and changes the ST type of the selected ST from "Debug" to "Release" (P2201). The management program 431 prohibits the editing of the ST whose ST type has been changed to "Release". Conceivable examples of prohibiting the editing include denying a user operation for the editing and not allowing the user to select a not-editable ST in the process of the editing.

Figure 23:
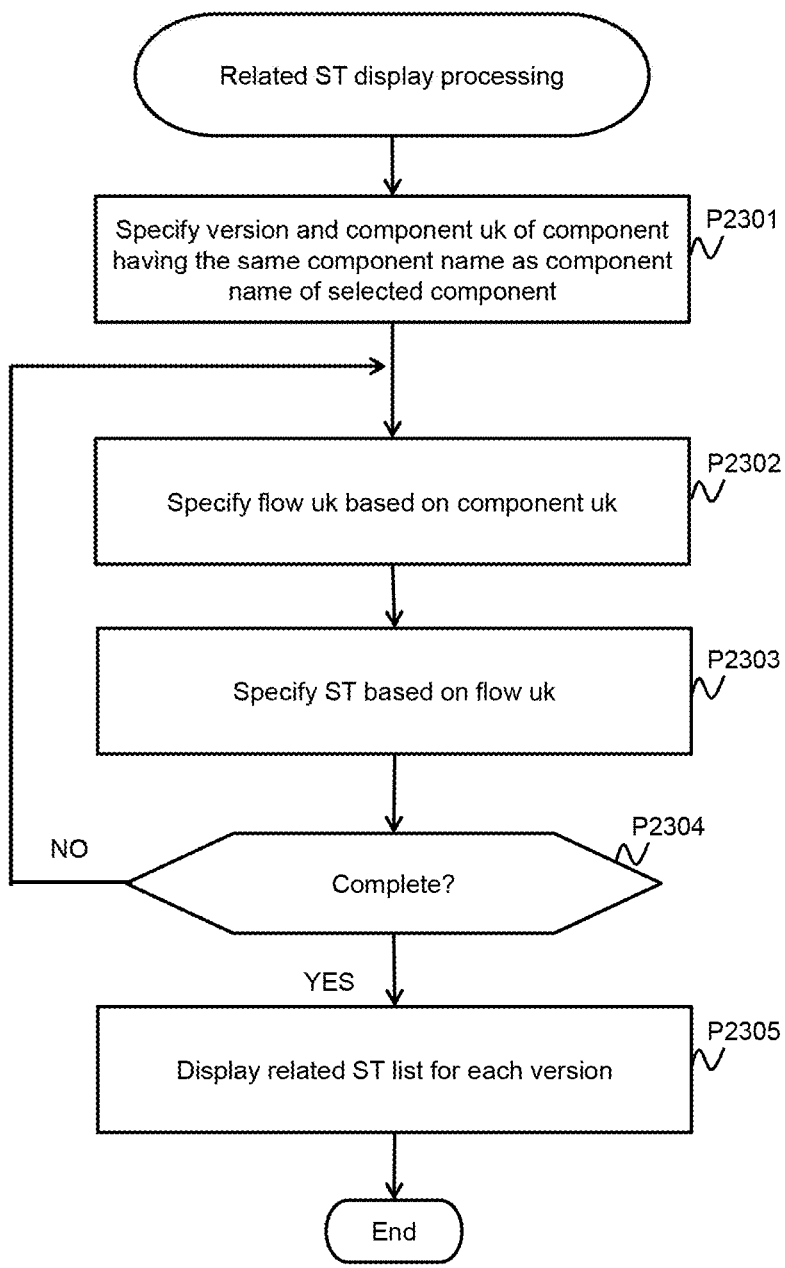
FIG. 23 is a flowchart of related ST display processing.

FIG. 23 is a flowchart of related ST display processing.

The management program 431 specifies, from the component management table 421, the version and component uk of the same component name as the component name of the selected component (for example, the component selected from the component list 1531 in FIG. 15) (P2301). The management program 431 specifies a flow uk corresponding to the specified component uk from the flow management table 424 (P2302). The management program 431 specifies the ST name and ST type corresponding to the specified flow uk from the ST management table 423 (P2303). The management program 431 performs P2302 and P2302 on every component uk specified in P2301 (P2304). After that, the management program 431 generates and displays a related ST list (a list of the ST name, version, and ST type of a related ST) for each version of the selected component (P2305).

Figure 24:
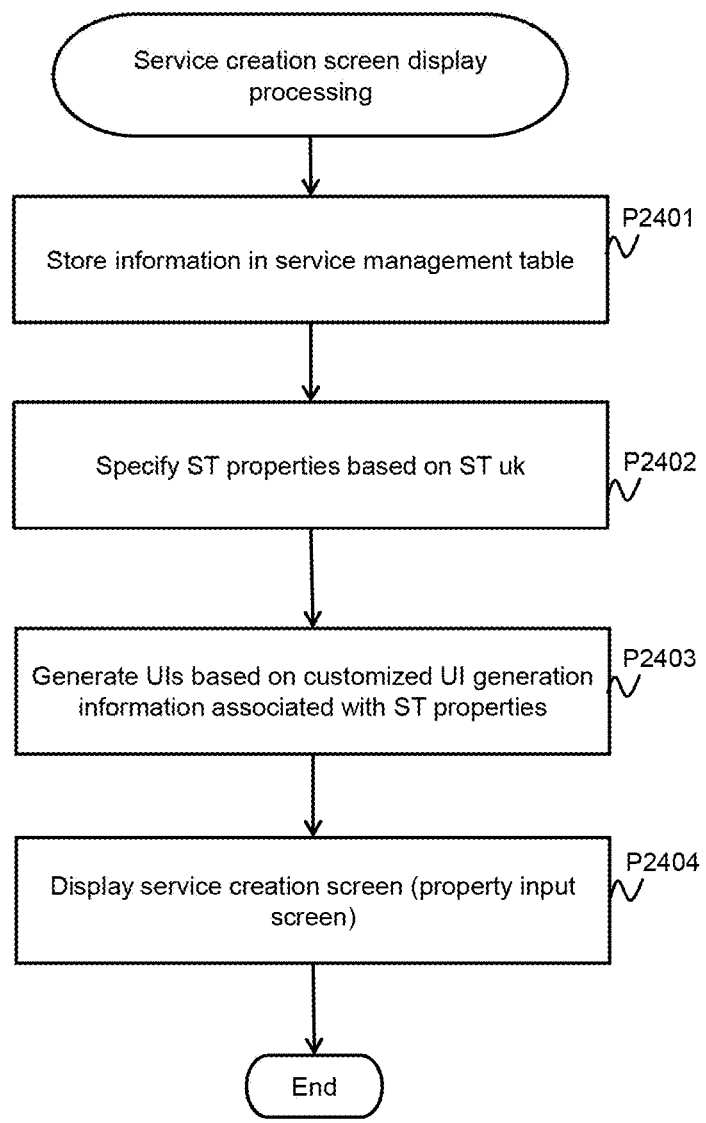
FIG. 24 is a flowchart of service creation screen display processing.

FIG. 24 is a flowchart of processing for displaying the service creation screen 1701.

The management program 431 receives a selection of the decided ST from the service creating user, and stores service information (for example, the ST uk) corresponding to the selected ST in the service management table 426 (P2401). The management program 431 specifies information related to all ST properties corresponding to the ST uk of the selected ST from the ST property management table 425 (P2402). The management program 431 generates a UI (a default UI or a customized UI) for each ST input property based on the customized UI generation information 1008 associated with the specified ST property (P2403), and displays the service creation screen 1701 (property input screen) including the generated UI (P2404).

Note that, in place of the customized UI generation information 1008 referred to in P2403, the management program 431 may specify a component property of the corresponding component in consideration of the value of the property mapping list 904 in the flow management table 424, and refer to the customized UI generation information 708 in the component property management table 422. The reason is that an UI on the service generation screen can be determined by referring to the customized UI generation information on the component directly or indirectly so that a highly convenient screen can be generated without the need for the service template creating user to design a service creation screen for each service template.

Figure 25:
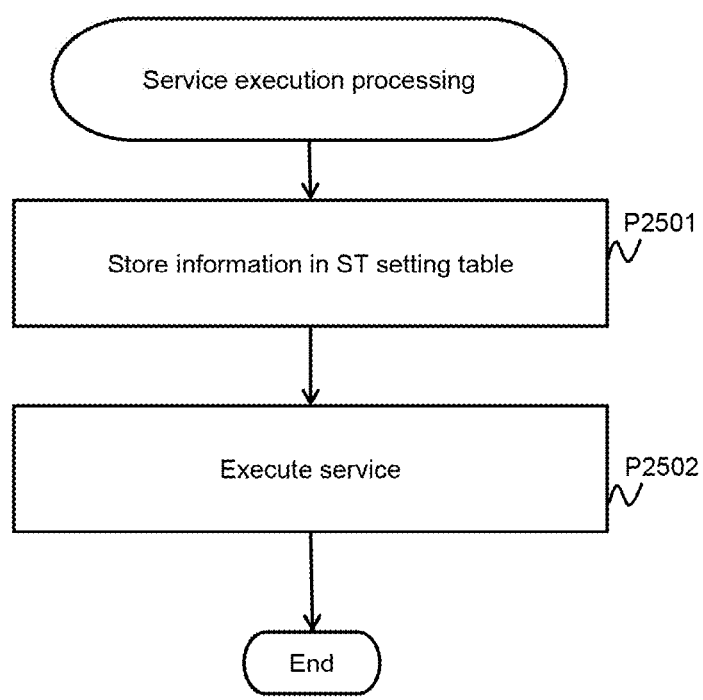
FIG. 25 is a flowchart of service execution processing.

FIG. 25 is a flowchart of service execution processing.

Service execution processing is started when a value is input to the UI on the screen displayed by the processing in FIG. 24 and the execution of the service is designated by the service creating user. Note that the service execution processing may diverge when the created service is registered to be in an execution queue and the execution of the service in the execution queue is instructed.

The management program 431 stores the value input on the service creation screen 1701 (property input screen) in the service property setting table 427 (P2501). After that, the management program 431 executes a service based on the input set value (P2502). Specifically, the management program 431 performs the following procedure.

(A) The management program 431 selects a service template that is the base of the service.

(B) The management program 431 refers to the component uk list 903 for the flow of the service template selected in (A), and specifies components to be executed together with the execution order.

(C) The management program 431 executes the components as specified in (B). In (C), the management program 431 refers to the property mapping list 904 to select an input property of an appropriate service property or an output property of another component, and inputs the value thereof. The thus input value is the input value to be set to the input property of the component to be executed. Note that "executing a component" refers to executing an executable file described in the executable file path 604.

(D) After the components are executed in accordance with the execution order, the management program 431 refers to the property mapping list 904 to select an output property of the component associated with the output property of the service template, and displays the value thereof as the output property of the service template as a result of executing the service. It should be understood that the processing for customized UIs and property groups may be applied to the service execution result.

Note that the processing content described in the executable file typically involves changing the configuration of the operation target apparatus or transmitting a request to acquire configuration information, metric information, and statuses from the operation target apparatus directly or indirectly to the operation target apparatus. Conceivable examples of directly transmitting a request to the operation target apparatus include when a request is directly transmitted from the operation automation system to the operation target apparatus. Conceivable examples of indirectly transmitting a request include when a request is transmitted to the computer management system 302 and when a maintenance message is transmitted to a maintenance engineer of the operation target apparatus and the maintenance engineer implements a maintenance task as operation of the operation target apparatus.

Figure 26:
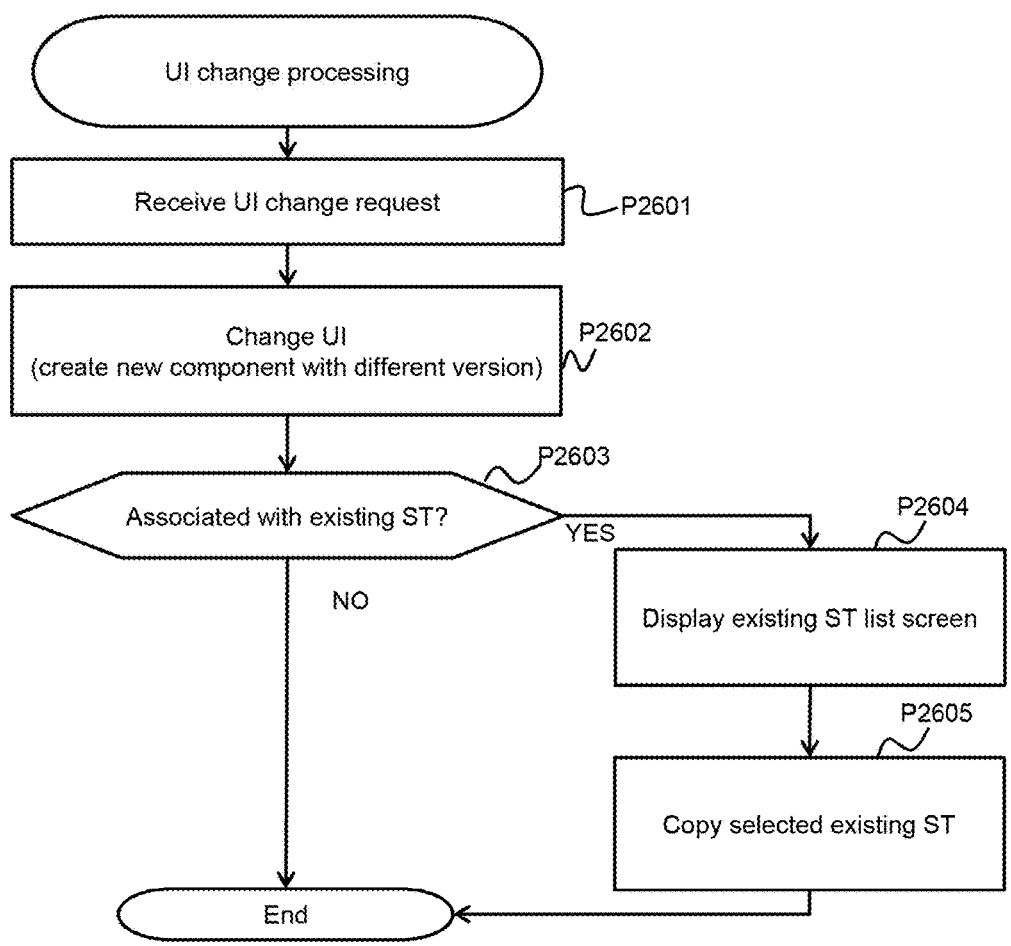
FIG. 26 is a flowchart of UI change processing.

FIG. 26 is a flowchart of UI change processing.

The management program 431 receives a UI change request (P2601), and executes P2602. In P2602, the management program 431 changes the UI in accordance with the UI change request. When the UI is changed, the management program 431 creates a copy of a component that is associated with the UI before the change, and allocates a new version (a version different from the version of the component that is associated with the UI before the change) to the component copy. The management program 431 then associates the changed UI (customized UI generation information representing the changed UI) with the component copy. The management program 431 stores (adds) information related to the component copy (the component with the new version) in the component management table 421, and stores (adds) information related to component properties associated with the component copy in the component property management table 422. Note that, when the component that is associated with the UI to be changed is not associated with any existing ST (or any existing decided ST (an ST whose ST type is "Release")), the management program 431 may receive the update of the UI without creating a copy of the component.

The management program 431 determines whether or not the UI designated by the change request is associated with an existing ST (P2603).

When the determination result in P2603 is positive (P2603: YES), the management program 431 displays a screen of a list of existing STs associated with existing components (P2604). In this case, the management program 43 creates a copy of the existing ST selected by the user (for example, creates a new ST with a different version based on the existing ST) (P2605), and replaces the existing component used for the created ST copy with a component having a new version. In this manner, the changed UI is prevented from being associated with the existing ST. The "existing ST" as used herein refers to an ST whose ST type is "Release". An ST whose ST type is "Debug" may be excluded from existing STs.

Note that the component UI change processing may be implemented in other ways than the above. For example, when the component providing user imports a component whose version is changed to the new one due to the update of the UI or imports a service template as a component, the version of the component is upgraded due to a change in customized UI generation information related to the service template.

Details of the ST version upgrade are described below.

Figure 27:
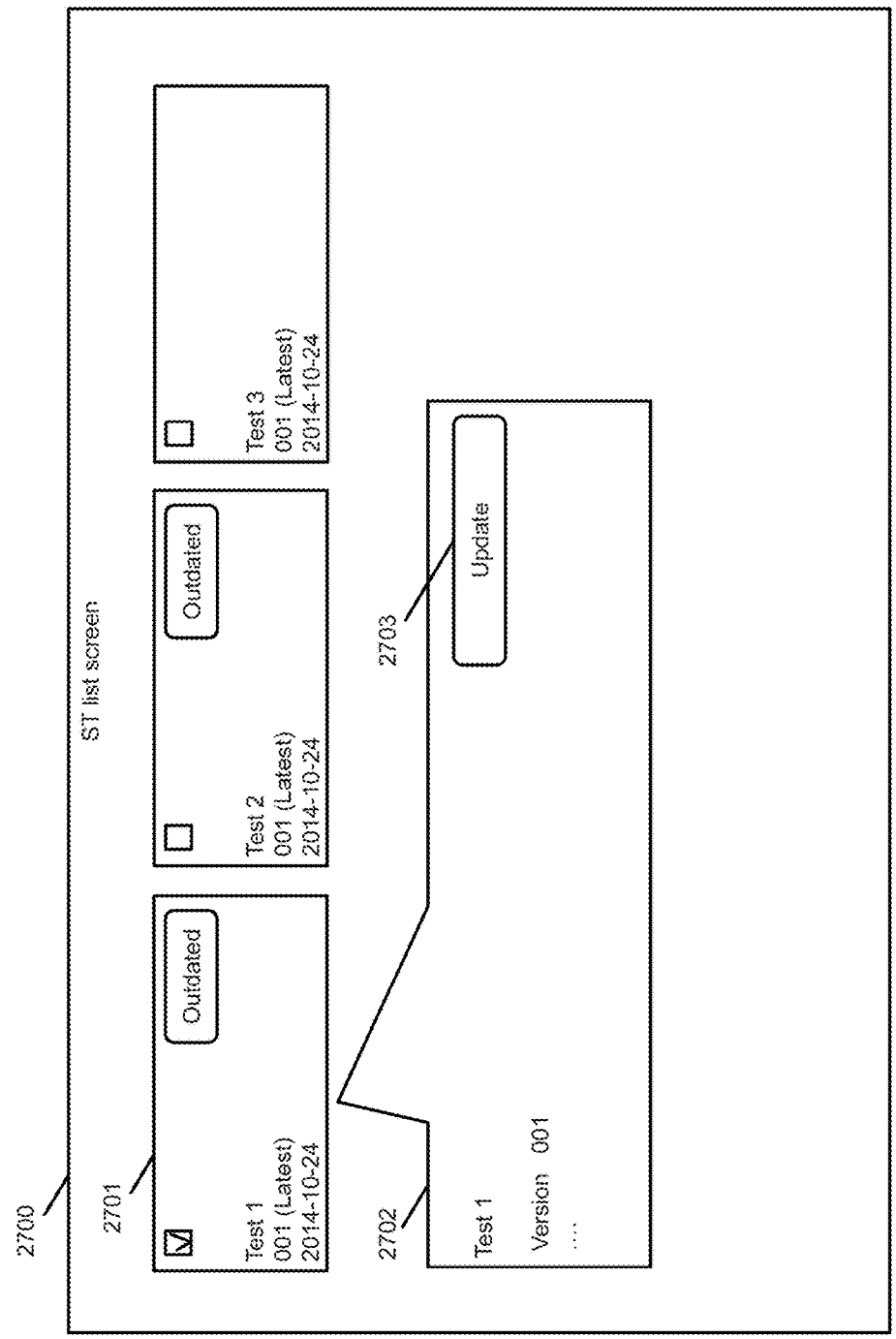
FIG. 27 illustrates a configuration of an ST list screen.

FIG. 27 illustrates a configuration of the ST list screen.

An ST list screen 2700 is a screen for displaying a list of STs. Specifically, the management program 431 specifies a plurality of STs base on the ST management table 423, and displays the ST list screen 2700 that displays a plurality of ST blocks (display objects) 2701 respectively corresponding to the plurality of specified STs.

Based on the step management table 428, the management program 431 may determine whether or not each of the plurality of specified STs is an ST whose version can be upgraded (in other words, whether or not the ST is associated with a component (step) with an old version although a component with the latest version exists in the ST). For example, the determination result may be positive when the value of each of the Outdated ST uk 1902 and the Outdated ST version 1903 is not "Null" but an ST is associated with the status 1909 "Not applied". When the determination result is positive, the management program 431 displays the ST block 2701 that is associated with a display object indicating that the version of the ST can be upgraded, for example, a mark displayed with "Outdated". The ST creating user can know whether or not the version of the ST can be upgraded by the presence/absence of the mark "Outdated". Consequently, the ST creating user can easily determine the timing of upgrading the version for each ST.

A checkbox is displayed in each ST block 2701. When the checkbox is checked, the management program 431 specifies details of an ST corresponding to the checked ST block 2701 from the ST management table 423 or the like, and displays the specified details 2702. The management program 431 displays an "Update" button 2703 for the checked ST block 2701. When the "Update" button 2703 is pressed, an ST corresponding to the pressed "Update" button 2703 becomes a designated ST, and an ST version upgrade screen is displayed by the management program 431.

Figure 28:
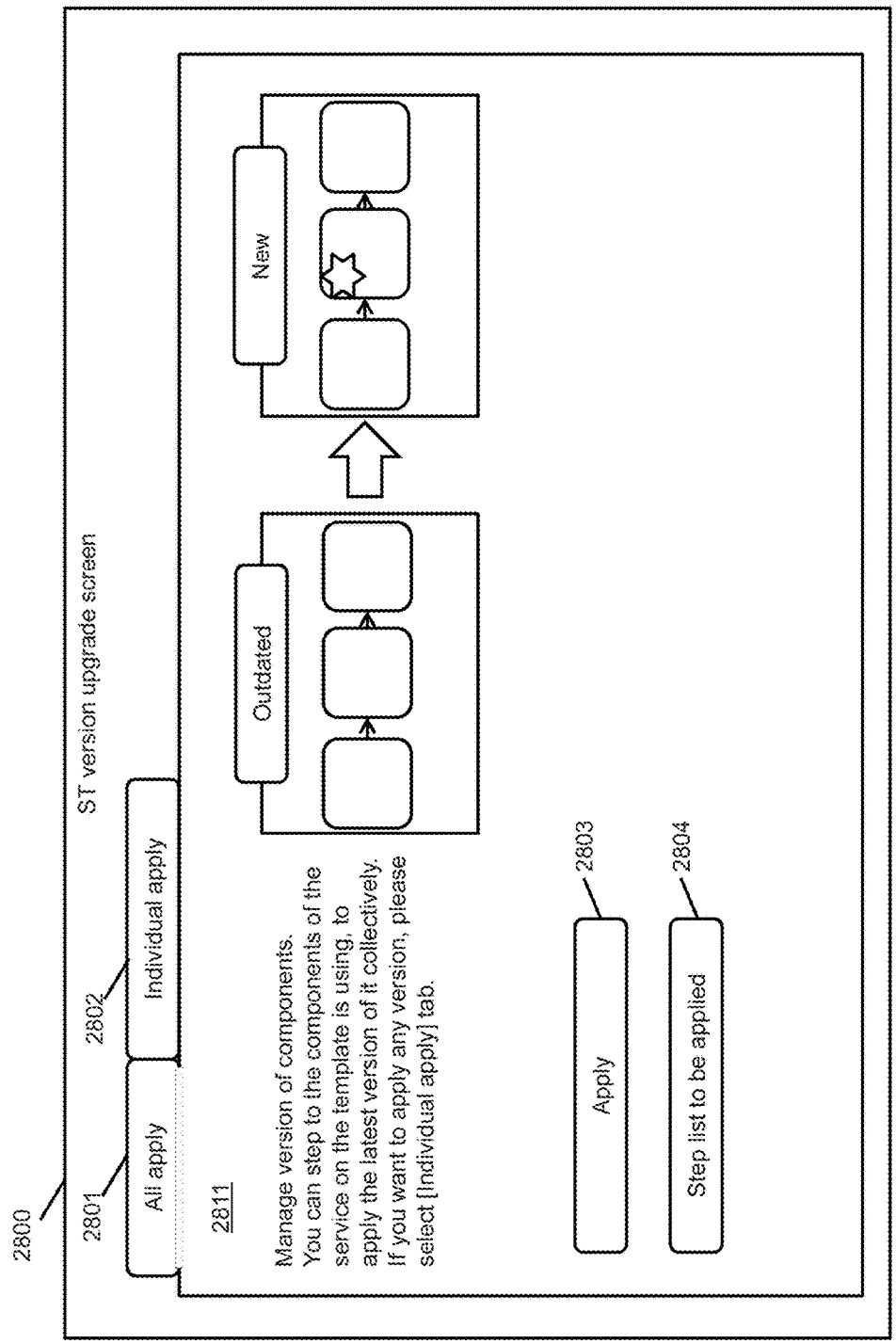
FIG. 28 illustrates a configuration of an ST version upgrade screen with an "All apply" tab selected.

FIG. 28 illustrate a configuration of the ST version upgrade screen.

On an ST version upgrade screen 2800, any one of an "All apply" screen 2811 having an "All apply" tab 2801 and an "Individual apply" screen having an "Individual apply" tab 2802 is displayed front, and the screens are switched depending on which of the tabs is selected. In FIG. 28, the "All apply" tab 2801 is selected, and hence the "All apply" screen 2811 is displayed front.

On the "All apply" screen 2811, an "Apply" button 2803 and a "Step list to be applied" button 2804 are displayed by the management program 431.

When the "Apply" button 2803 is pressed, a version upgrade request associated with a designated ST (that is, an ST is designated) is input to the management program 431, and the management program 431 executes ST version upgrade processing in response to the request. Specifically, for example, the management program 431 specifies all components with the latest version respectively corresponding to all steps with old versions associated with a copy of the designated ST from the step management table 428, and replaces all the steps with the old versions with all the specified components with the latest versions. During this processing, the management program 431 may display the progress of processing (for example, the number of components with old versions and the number of steps that has been replaced (version has been upgraded) (the status 1909 has been changed to "Applied")).

Figure 29:
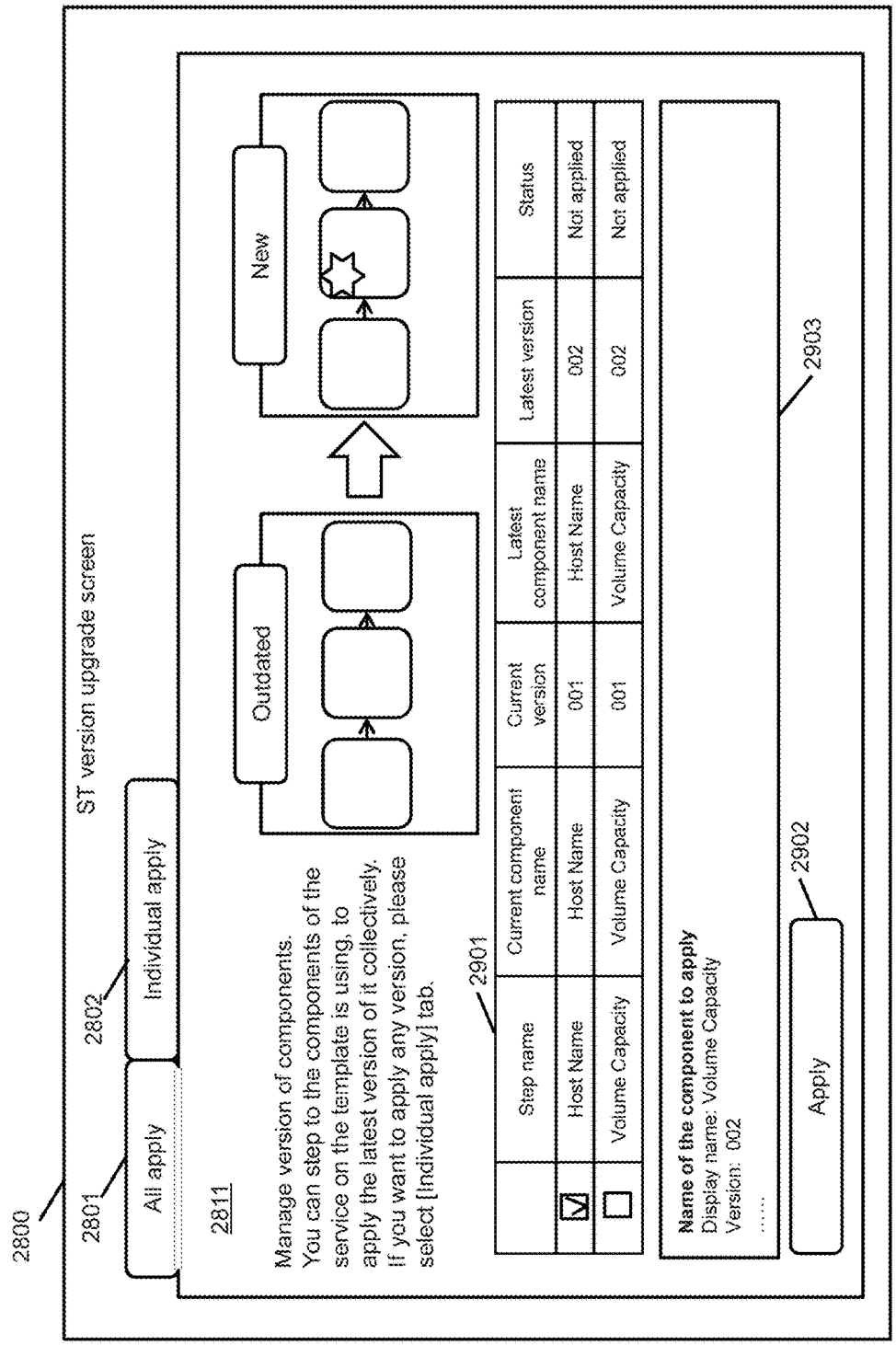
FIG. 29 illustrates a configuration of the ST version upgrade screen with a "Step list to be applied" button pressed.

When the "Step list to be applied" button 2804 is pressed, the management program 431 specifies all records corresponding to the designated ST (all records whose Outdated ST uk 1902 and Outdated ST version 1903 correspond to the designated ST) from the step management table 428, and as illustrated in FIG. 29, displays a list 2901 of information on all old version steps (components) respectively corresponding to all the specified records on the "All apply" screen 2811. One or more records in the list 2901 correspond to one or more steps (old versions) associated with the designated ST. Each record has a checkbox. When the checkbox is checked (that is, the step is selected) by the ST creating user and an "Apply" button 2902 is pressed, a version upgrade request in which the designated ST and the selected step are associated with each other is input to the management program 431. In response to the request, the management program 431 replaces the old version step associated with a copy of the designated ST (that is, the step selected by the ST creating user) with a component with the latest version. Note that, in this case, the replaced component is always the component with the latest version, but a UI for receiving a changed version of the selected step (component) (or another UI) may be displayed on the "All apply" screen 2811 by the management program 431. The UI may be either of a customized UI or a default UI. Specifically, information on the UI on the ST version upgrade screen 2800 (for example, whether the UI is a customized UI or a default UI) may be included in a component property, and a UI to be expanded on the ST version upgrade screen 2800 (for example, the "All apply" screen 2811 or an "Individual apply" screen described later) may be generated by the management program 431 based on the information. In addition to the list 2901, a detailed field 2903 may be displayed on the "All apply" screen 2811 by the management program 431 when the "Step list to be applied" button 2804 is pressed. On the detailed field 2903, detailed information on a latest component (latest version component) corresponding to a record selected by the user from the list 2901 (for example, a record clicked after a mouse cursor is overlaid) may be displayed by the management program 431.

Figure 30:
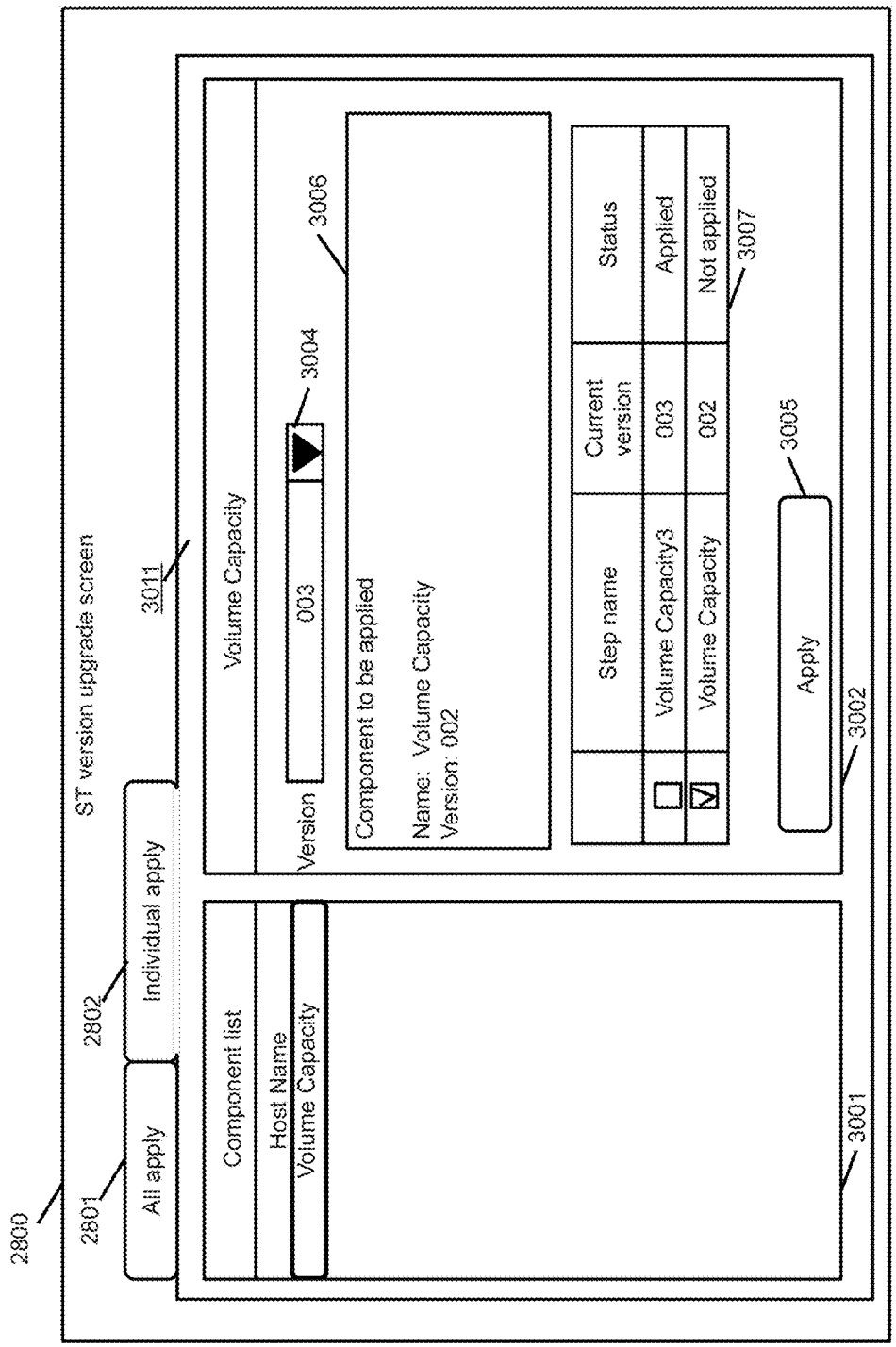
FIG. 30 illustrates a configuration of the ST version upgrade screen with an "Individual apply" tab selected.

When the "Individual apply" tab 2802 is selected, as illustrated in FIG. 30, the management program 431 displays an "Individual apply" screen 3011 front (FIG. 30). The "Individual apply" screen 3011 includes a component list plane 3001 and a selected component plane 3002.

The component list plane 3001 is a vertically elongated plane located on the left side of the "Individual apply" screen 3011. On the component list plane 3001, not a list of all components associated with a designated ST, but a list of only components having a plurality of versions among components associated with a designated ST is displayed. Specifically, for example, the management program 431 specifies records whose latest component names 1907 and latest versions 1908 are not "Null" from the step management table 428, and displays a list of the latest component names 1907 described in the specified records on the component list plane 3001. From the list, the ST creating user selects a step (component) whose version is to be changed. On the component list plane 3001, a step whose version cannot be changed (a step having only one version) is not displayed. Thus, visibility is high.

Note that a designated ST is sometimes associated with a plurality of identical components (steps) as described later (the versions are the same or different depending on cases), and a plurality of identical components may be displayed in a list. In this embodiment, however, irrespective of the number of identical components associated with a designated ST, the number of the identical components displayed in a list is one. Thus, the visibility is further enhanced.

On the plane 3001, a list of all components associated with a designated ST may be displayed in response to a request from an ST management user.

On the selected component plane 3002, information on a component selected from the list displayed on the component list plane 3001 is displayed. In the example of FIG. 30, a component ("Volume Capacity") selected from the list (list of latest component names) is associated with two steps, and hence the step name of each of the two steps associated with the selected component is displayed on the selected component plane 3002. The step name may be different for each step.

On the selected component plane 3002, information on the selected component is displayed. Specifically, for example, a version designation pulldown menu 3004, a detailed field 3006, a candidate step list 3007, and an "Apply" button 3005 are displayed on the selected component plane 3002.

The version designation pulldown menu 3004 is a UI for designating a changed version. The version designation pulldown menu 3004 displays a menu of designatable versions that are specified from the component property management table 422 for the selected component.

On the detailed field 3006, detailed information (for example, information specified from the step management table 428) on a step selected from the candidate step list 3007 (for example, a step corresponding to a checked record).

The candidate step list 3007 is a list of one or more steps associated with the component selected from the list on the plane 3001. In FIG. 30, a component "Volume Capacity" is selected from the list on the plane 3001, and two steps are associated with the component for the designated ST. Accordingly, the candidate step list 3007 has two records corresponding to the two steps, respectively. Each record has a checkbox and at least apart of the record in the step management table 428 (for example, the step name, the current version, and the status).

It is understood from FIG. 30 that the designated ST includes a component (step) "Volume Capacity3" with a version 003 and a component (step) "Volume Capacity" with a version 002. The status of the component "Volume Capacity3" with the version 003 is "Applied", and hence it is understood that the version 003 of the component "Volume Capacity3" is the same as the version designated by the version designation pulldown menu 3004 or has been upgraded, and it is unnecessary to set the component "Volume Capacity3" as a version upgrade target. The step is unique, and the same step does not exist in a plurality of different STs. Referring to FIG. 30, the component "Volume Capacity" (version 002) whose status is "Not applied" is checked (that is, the component "Volume Capacity" (version 002) is selected), and hence detailed information on the component (step) "Volume Capacity" (version 002) is displayed in the detailed field 3006. The version selected by using the version designation pulldown menu 3004 is the changed version of the selected step "Volume Capacity" (version 002). In the detailed field 3006, detailed information on a component of the version selected by the version designation pulldown menu 3004 may be displayed by the management program 431.

When the "Apply" button 3005 is pressed, a version upgrade request associated with the designated ST, the selected step, and the changed version is input to the management program 431. In response to the request, the management program 431 replaces the old version step associated with a copy of the designated ST (that is, the step selected by the ST creating user) with a component with the changed version.

In this manner, the "Individual apply" mode enables the ST creating user to change the version of a desired step among steps associated with the designated ST. Thus, the version can be changed by selecting only a component that is less liable to produce a problem when the version is changed (typically, the version is upgraded) for the designated ST from among steps associated with the designated ST. Consequently, the probability of causing a problem by the ST version upgrade can be reduced.

In either of the "All apply" mode or the "Individual apply" mode, the ST version upgrade involves replacing a component (step) before version change (for example, with the old version) with a component after version change (for example, with the latest version). In the ST version upgrade, in this embodiment, an input value (at least a value set by a user such as the ST creating user and the component creating user) of a component input property associated with the component before version change is input (handed over) to a component input property associated with the component after version change.

Figure 31:
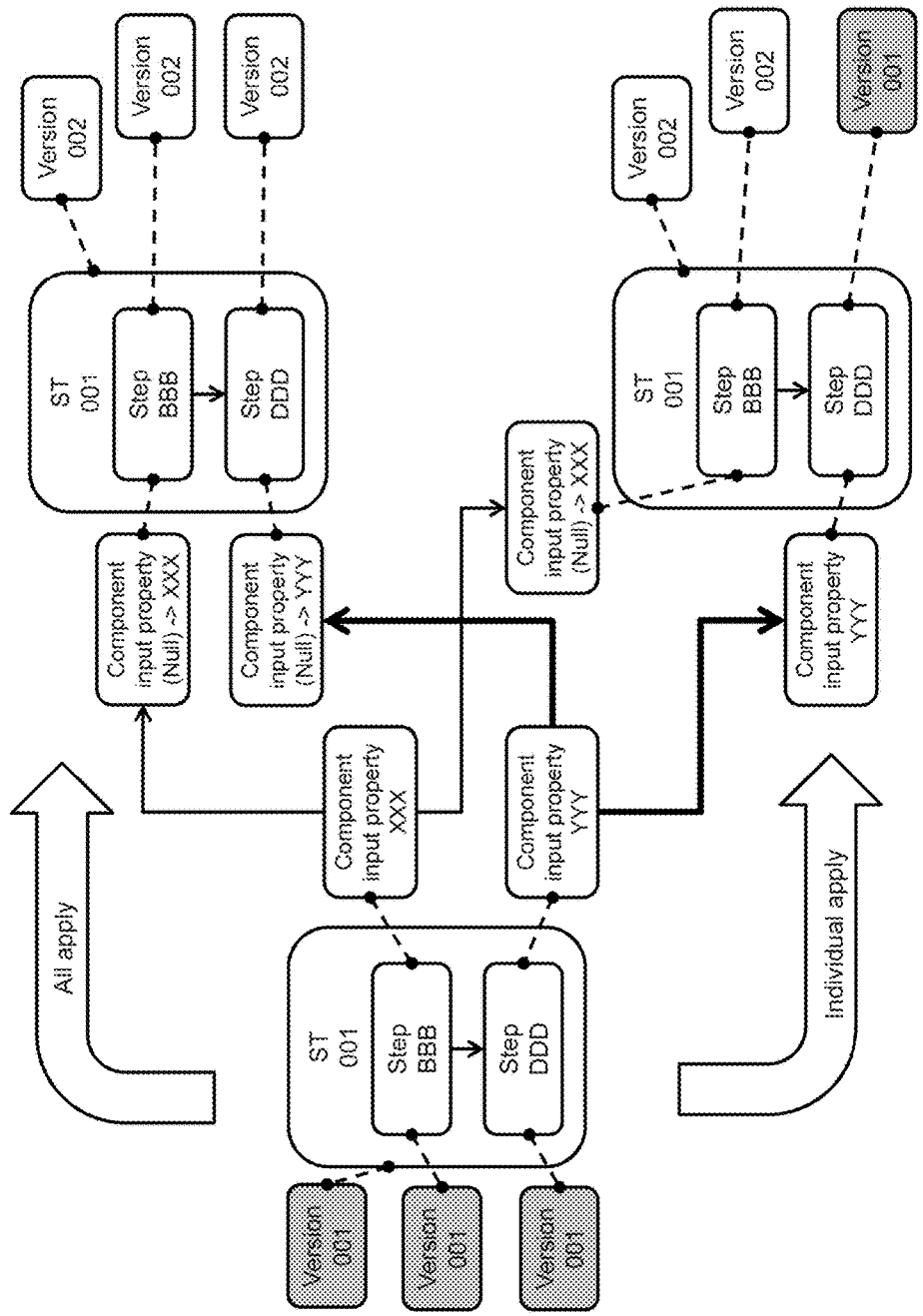
FIG. 31 illustrates a handover of input values of component input properties.

FIG. 31 illustrates a handover of input values of component input properties.

An ST001 (version 001) is associated with a component BBB (version 001) and a component DDD (version 001). An input value (for example, a value set by the user) of a component input property associated with the component BBB (version 001) is "XXX", and an input value of a component input property associated with a component YYY (version 001) is "YYY".

In the "All apply" mode, as described above, all the step BBB and the step DDD with the old versions associated with a copy of the ST001 (ST001 with version 002) are replaced with a step BBB with a new version 002 and a step DDD with a new version 002, respectively. In this case, the management program 431 changes the value of the component input property associated with the step BBB with the new version 002 from "Null" to the input value "XXX" of the component input property associated with the step BBB with the old version 001, and changes the value of the component input property associated with the step DDD with the new version 002 from "Null" to the input value "YYY" of the component input property associated with the step DDD with the old version 001.

In the "Individual apply" mode, as described above, only the selected step BBB among the step BBB and the step DDD with the old versions associated with a copy of the ST001 (ST001 with version 002) is replaced with the step BBB with the new version 002. In this case, the management program 431 changes the value of the component input property associated with the step BBB with the new version 002 from "Null" to the input value "XXX" of the component input property associated with the step BBB with the old version 001. On the other hand, the input value of the component input property associated with the step DDD whose version has not been changed is still "YYY".

In this manner, in the ST version upgrade, the input value of the component input property associated with the component before version change is automatically handed over to the component input property associated with the component after version change along with the version change of the component. Consequently, labor hours for the user to manually input the same input value for the component after version change as the input value for the component before version change can be reduced.

As described above, in this embodiment, a component is typically a plugin component, but a service template itself can be a component. Thus, the management program 431 can associate, in response to the operation from the user, an ST with one or more of at least one plugin component and at least one created ST as components.

In this manner, a created ST can be associated with an ST as one component, and hence a more advanced ST can be created. When one component associated with an ST is another ST, the ST associated as a component is hereinafter referred to as "child ST", and the ST associated with the child ST is hereinafter referred to as "parent ST". Cases are considered in which the version of a service template having such a parent-child relation is upgraded. For example, the following cases are considered.

(Case 1) The version is upgraded by designating a service template associated with a parent ST.
(Case 2) The version is upgraded by designating a service template associated with a child ST.

In either of the cases, in addition to the version of the designated service template, the version of the parent ST or child ST associated therewith may be upgraded together. However, it is preferred to upgrade the versions of the service template separately by using copies thereof.

First, Case 1 is considered. It is assumed that only service templates after version upgrade are left without using a copy. In this case, an associated parent ST forcibly uses a component after version upgrade because there is no child ST before version upgrade. This causes the same problem as described above. Thus, it is desired that service templates before and after version upgrade exist by using a copy. The same problem occurs also when a parent ST is automatically associated with a service template after version upgrade. Thus, it is desired to perform the version upgrade of a child ST and the version upgrade of a parent ST separately.

Next, Case 2 is considered. It is assumed that the version of a child ST is upgraded along with the version upgrade of a parent ST. If the version of the child ST is upgraded without using a copy, a service template before version upgrade is eliminated, and there is a problem in that other parent STs cannot be executed or the user cannot use a service template before version upgrade. Thus, it is desired to upgrade the version of a child ST by using a copy. However, if a plurality of parent STs have a common child ST and the version of the parent ST is automatically upgraded by using a copy of the version upgrade of the child ST, the child ST is copied every time the version of the parent ST is upgraded. For example, when four parent STs are associated with a child ST and the version of each parent ST is upgraded five times, 4×5=20 copies of the child ST exist, and the management of the versions of the child ST becomes difficult. Thus, it is desired to perform the version upgrade of a child ST and the version upgrade of a parent ST separately. Note that the above-mentioned idea of performing version upgrade separately by using a copy may be applied to both of the "All apply" mode and the "Individual apply" mode. Note that a conceivable example of applying the idea to the "Individual apply" mode is that when the version of a parent ST is upgraded, the fact that a component associated with an associated child ST is a version upgrade target is not displayed.

One ST is associated with a plurality of identical components as described above (for example, in FIG. 18, an ST (version 005) as a component exists in a component group). In either of the "All apply" mode or the "Individual apply" mode, the management program 431 can determine whether or not a designated ST is associated with a plurality of identical components based on the step management table 428. Then, when the determination result is positive in the "All apply" mode, the management program 431 receives, for each of the plurality of identical components, a selection whether to set the component as a version change target and a designation of the changed version when the component is set as a version change target. When the determination result is positive in the "Individual apply" mode, the management program 431 generates and displays the candidate step list 3007 (see FIG. 30) including a plurality of records respectively corresponding to the plurality of identical components, thereby receiving, for each of the plurality of identical components, a selection whether to set the component as a version change target and a designation of the changed version when the component is set as a version change target. One reason that such processing is performed is that, for example, a use case described with reference to FIG. 32 to FIG. 34 is possible (steps are expressed as "(S)" in FIG. 32 to FIG. 34).

Figure 32:
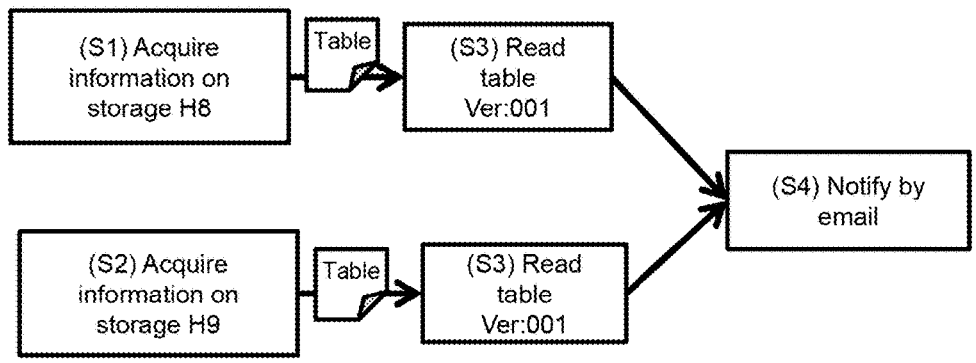
FIG. 32 illustrates a first phase of an exemplary use case.

Specifically, as illustrated in FIG. 32, one ST (hereinafter referred to as "target ST" in the description with reference to FIG. 32 to FIG. 34) defines the following flow of steps. That is, a table in which information on a storage H8 is described is acquired (S1), and the table acquired in the previous step is read (S3). On the other hand, a table in which information on a storage H9 is described is acquired (S2), and the table acquired in the previous step is read (S3). Then, information described in the read tables is notified by email (S5). In this manner, the target ST includes one step (S1), one step (S2), and one step (S4), and two steps (S3). In other words, two identical steps (S3) exist in the target ST. Each of the steps (S3) has the version 001.

Figure 33:
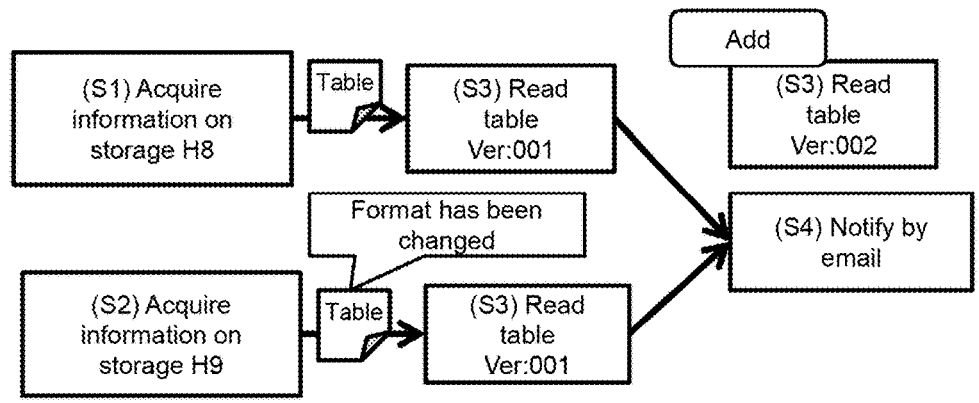
FIG. 33 illustrates a second phase of the exemplary use case.
Figure 34:
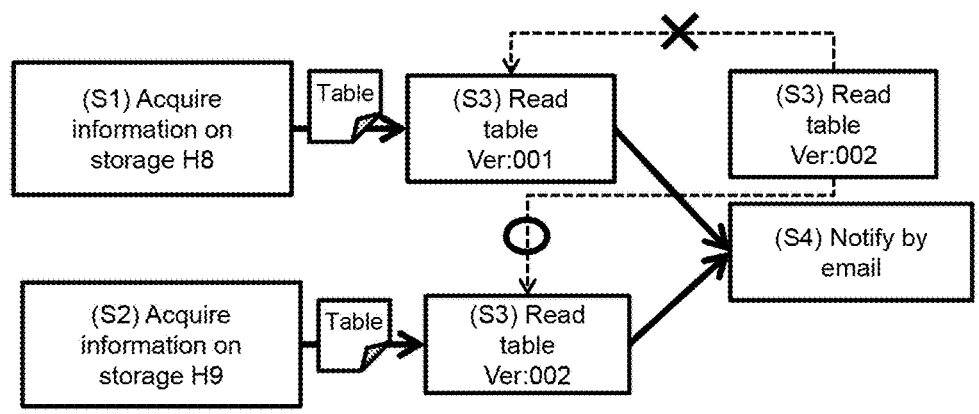
FIG. 34 illustrates a third phase of the exemplary use case.

Then, as illustrated in FIG. 33, because the format of the table in which the information on the storage H9 has been changed (for example, a variation in number of items or a change in time display format in the table), a component (S3) (version 002) that deals with the format change is added. At this time point, each of the two steps (S3) associated with the target ST becomes an old version step (component).

According to this situation, the step (S3) next to the step (S2) needs to be changed to the step (S3) with a new version 002, but the version of the step (S3) next to the step (S1) needs to be prevented from being changed.

As a solution, in either of the "All apply" mode or the "Individual apply" mode, as illustrated in FIG. 34, the management program 431 specifies that a plurality of identical steps (S3) are associated with a designated ST (target ST) based on the step management table 428, and receives, for each of the plurality of identical steps (S3), a selection whether to set the step as a version change target and a designation of the changed version when the step is set as a version change target. According to this use case, the management program 431 receives, from the ST creating user via the user interface, a selection of the step (S3) next to the step (S2) as a selection of a step of a version change target and receives a designation of the changed version 002. In accordance with the selection and designation, the management program 431 replaces the step (S3) (version 001) next to the step (S2) with the step (S3) (version 002), and maintains the relation between the step (S1) and the step (S3) (version 001).

Figure 35:
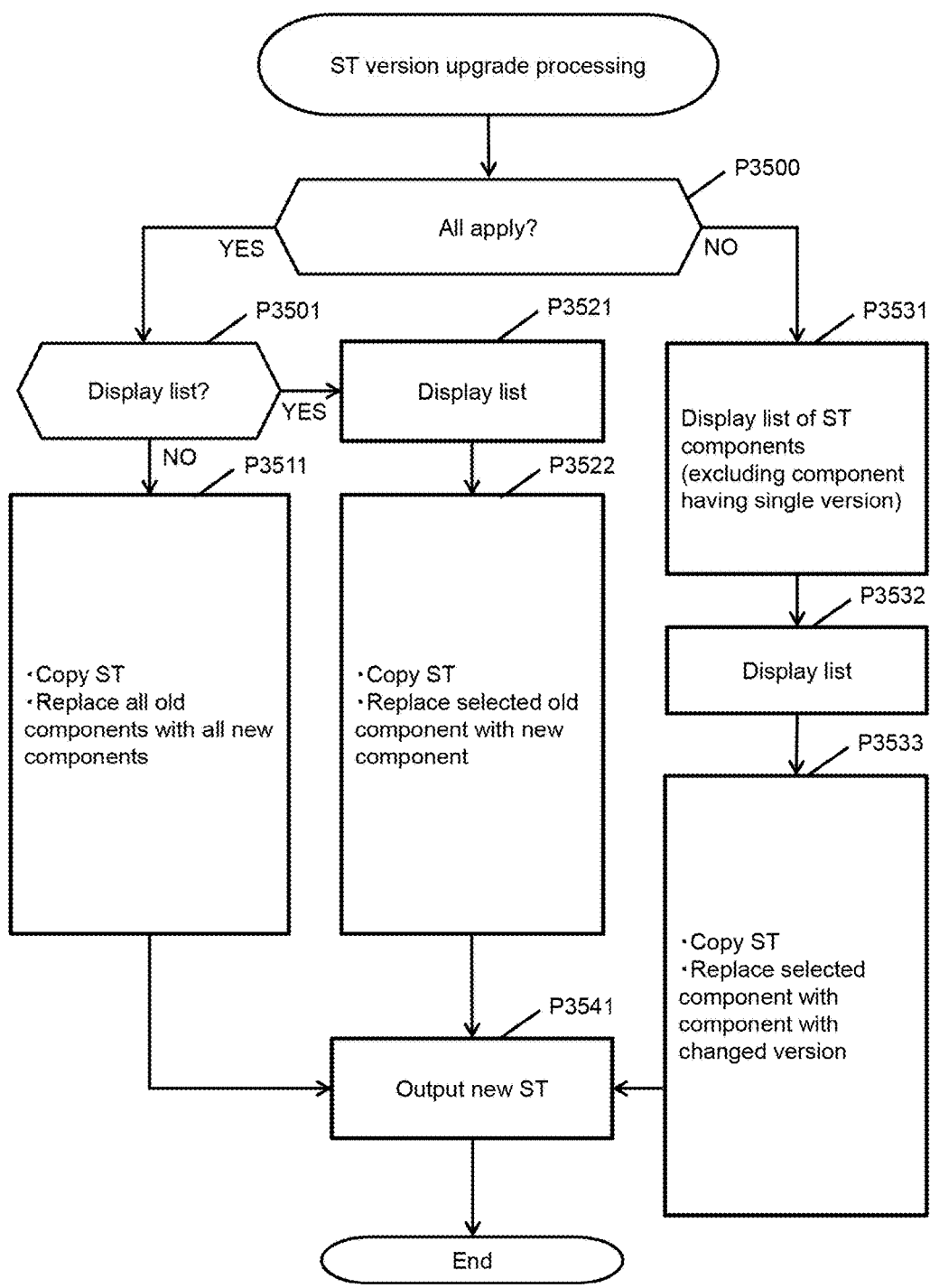
FIG. 35 is a flowchart of ST version upgrade processing.

FIG. 35 is a flowchart of ST version upgrade processing.

When the management program 431 receives a designation of an ST via, for example, the ST list screen 2700 (see FIG. 27), the management program 431 displays the ST version upgrade screen 2800 (see FIG. 28). Then, the management program 431 receives a selection of any one of the "All apply" tab 2801 and the "Individual apply" tab 2802 (P3500).

When the "All apply" tab 2801 is selected (P3500: YES), the management program 431 determines whether to display a list (P3501). For example, when the "Step list to be applied" button 2804 is pressed or when a plurality of identical steps are specified to be associated with the designated ST, the determination result of P3501 is positive. On the other hand, for example, when the "Apply" button 2803 is pressed, the determination result of P3501 is negative.

When the determination result of P3501 is negative (P3501: NO), the management program 431 receives a version upgrade request associated with the designated ST, and performs P3511 in response to the request. Specifically, the management program 431 generates a copy of the designated ST, and replaces all old steps (old version steps) among steps (components) associated with the designated ST with all latest components (latest version components). In this case, the management program 431 inputs an input value of a component input property of the old step to a component input property of the latest component.

When the old step is a child ST, the management program 431 skips the old step without upgrading the version. After P3511, the management program 431 displays information on a new ST whose version has been upgraded (an ST copy associated with components whose versions have been changed) (for example, the version of the ST after version upgrade) (P3541).

When the determination result of P3501 is positive (P3501: YES), the management program 431 displays the list 2901 of old steps (old version steps) associated with the designated ST. Then, when a step is selected from the list 2901 and the "Apply" button 2902 is pressed, the management program 431 receives a version upgrade request in which the designated ST and the selected step are associated with each other, and performs P3522 in response to the request. Specifically, the management program 431 generates a copy of the designated ST, and replaces the old step (old version step) selected from steps (components) associated with the designated ST with a latest component (latest version component). In this case, the management program 431 inputs an input value of a component input property of the old step to a component input property of the latest component. After P3522, the management program 431 performs P3541.

When the "Individual apply" tab 2802 is selected (P3500: NO), the management program 431 refers to the step management table 428 to specify steps having a plurality of versions among steps associated with the designated ST, and displays a list of only the specified steps on the component list plane 3001. Specifically, for example, the management program 431 specifies records whose latest component names 1907 and latest versions 1908 are not "Null" from the step management table 428, and displays a list of step names 1904 described in the specified records on the component list plane 3001 (P3531). When the ST creating user selects a step (component) whose version is to be changed from the list, the management program 431 displays a candidate step list 3007 about the selected step (P3532). When a step is selected from the list 3007, the changed version is designated from the version designation pulldown menu 3004, and the "Apply" button 3005 is pressed, the management program 431 receives a version upgrade request associated with the designated ST, the selected step, and the changed version, and performs P3533 in response to the request. Specifically, the management program 431 generates a copy of the designated ST, and replaces the selected old step (old version step) among the steps (components) associated with the designated ST with a component having the designated changed version. After P3533, the management program 431 performs P3541.

While one embodiment has been described, the embodiment is merely illustrative to describe this invention and is not intended to limit the scope of this invention to only the embodiment. This invention can be implemented in various other forms.

For example, the customized UI may be applied to the ST version upgrade screen (for example, a version designating UI in the Individual apply mode (for example, a pulldown menu instead of a text field)).

In the embodiment, a test is executed on an ST before the ST type is set to "Release", and when no defect is found, the ST type of the ST is set to "Release", and the editing of the ST corresponding to the ST type "Release" is then disabled. However, when some defect is found for the ST after the ST type is set to "Release", a copy of the ST may be generated, the ST type corresponding to the copy of the ST may be set to "Debug", and the copy of the ST may be improved. In other words, even after the ST type is set to "Release", the copy of the ST may be created for improvement.

For example, in the ST version upgrade processing, the management program 431 is not necessarily required to create a copy of a designated ST in P3511, P3522, and P3533, and may create a copy of a designated ST before P3511, P3522, and P3533 (for example, before P3500). For example, the management program 431 may create a copy of a designated ST and display the screen in FIG. 28 in response to the pressing of the "Update" button 2703 in FIG. 27 (a selection of the "All apply" mode and the "Individual apply" mode may be received after a copy of a designated ST is created).

REFERENCE SIGNS LIST

301 Operation automation system
311 Management server
312 Management client

The invention claimed is:

1. A management system for supporting operation management of a computer system, comprising:
   a processor;
   a storage resource operatively coupled with the processor that stores information of a plurality of service templates associated with one or more practicable components in execution order and an information of a version of the components; and
   a display operatively coupled with the processor;
   wherein the processor, based on the information of the plurality of service templates associated with the one or more practicable components in execution order and the information of a version of the components stored in the storage resource:
      (1) detects an existence of a component of a new version;
      (2) determines the existence of a service template associated with a component of an old version of the detected component;
      (3) causes the display to display a display object which shows that the service template can update the version and which is associated with a mark "OUTDATED" that shows a component of the old version is used when there is a service template associated with a component of the old version;
      (4) receives a version upgrade request of the service template designated based on the display object; and
      (5) causes a version of a target component associated with the designated service template or a copy of the designated service template to be replaced with the component of the new version, in response to the version upgrade request.

2. The management system according to claim 1, wherein, in (5), the target component with the new version is associated with a copy of the designated service template in place of the target component of the old version.

3. The management system according to claim 1, wherein the processor:
      (6) receives, via a user interface, a selection of a component of a version change target among one or more components associated with the designated service template, and a designation of a version after change,
   the version upgrade request is associated with the selected component and the designated upgraded version, and
   the target component is the component selected in (6).

4. The management system according to claim 3, wherein the processor, when a plurality of identical components are associated with the designated service template, receives in (6) for each of the plurality of identical components, a selection whether or not the component is set as a version change target and a designation of a version after change when the component is set as a version change target.

5. The management system according to claim 3, wherein the processor receives a selection of any one of an individual apply mode and an all apply mode via the user interface,
   the processor executes (6) when receiving the selection of the individual apply mode, and
   the processor, when receiving the selection of the all apply mode:
      (7) associates, in place of all components with old versions among components associated with a copy of the designated service template, components with latest versions with the copy of the designated service template.

6. The management system according to claim 5, wherein
   the service template is associated with one or more components among at least one plugin component and at least one service template component,
   the service template component is a created service template, and
   the processor, when the component with the old version is another service template, avoids upgrading a version of the service template serving as the component with the old version in (7).

7. The management system according to claim 6, wherein
   the plugin component is a component provided by a vendor of the operation target apparatus or a vendor of the management program, and
   the service template component is a component provided by a user different from a component providing user.

8. The management system according to claim 5, wherein the processor, when a plurality of identical components are associated with the designated service template, receives in (6) for at least one of the plurality of identical components, a selection whether or not the component is set as a version change target and a designation of a version after change when the component is set as a version change target.

9. The management system according to claim 3, wherein
   the processor displays a list of only components having a plurality of versions among the one or more components associated with the designated service template,
   the component selected in (6) is a component selected from the list.

10. The management system according to claim 1, wherein
    the service template is associated with one or more components among at least one plugin component and at least one service template component, and
    the service template component is a created service template.

11. The management system according to claim 10, wherein
    the plugin component is a component provided by a vendor of the operation target apparatus or a vendor of the management program, and
    the service template component is a component provided by a user different from a component providing user.

12. The management system according to claim 10, wherein
    the plugin component is a component of a minimum unit, and
    the service template component is a package including one or more plugin components and a service template associated with the one or more plugin components.

13. The management system according to claim 1, wherein
    the processor:
      specifies, from among created service templates, a service template which is associated with a component with an old version and in which a component with a latest version exists; and
      displays the specified service template in association with a display object indicating that a version of the specified service template is upgradeable,
    the service template designated by the version upgrade request is a service template selected from the service templates associated with the display object.

14. The management system according to claim 1, wherein
    the target component associated with the designated service template is a component including a component input property and a processing content to be executed based on an input value that is input to the component input property, and the processor inputs, in (5), an input value of a component input property of a target component before version change to a component input property of a target component after version change.

15. An operational management method in a management server coupled to a client,
wherein the management server stores information of a plurality of service templates associated with one or more practicable components in execution order and information of a version of the components; and
wherein based on the information of the plurality of service templates associated with the one or more practicable components in execution order and the information of the version of the components stored in the storage unit, the management server:

detects an existence of a component of a new version;
determines existence of service template associated with a component of an old version of the detected component;
causes the client to display a display object which shows that the service template can update version and which is associated with a mark "OUTDATED" that shows a component of the old version is used when there is a service template associated with a component of the old version;
receives a version upgrade request of the service template designated based on the display object; and
causes a version of a target component associated with the designated service template or a copy of the designated service template to replace with the component of the new version, in response to the version upgrade request.

* * * * *